US012803100B2

(12) United States Patent
Huang et al.

(10) Patent No.: US 12,803,100 B2
(45) Date of Patent: Nov. 17, 2026

(54) ENERGY STORAGE POWER SUPPLY

(71) Applicant: SHENZHEN HELLO TECH ENERGY CO., LTD, Shenzhen (CN)

(72) Inventors: Shuisheng Huang, Shenzhen (CN); Zhongwei Sun, Shenzhen (CN); Gaosong Shen, Shenzhen (CN); Yongjun Chen, Shenzhen (CN)

(73) Assignee: SHENZHEN HELLO TECH ENERGY CO., LTD, Shenzhen (CN)

(*) Notice: Subject to any disclaimer, the term of this patent is extended or adjusted under 35 U.S.C. 154(b) by 0 days.

(21) Appl. No.: 19/328,273

(22) Filed: Sep. 15, 2025

(65) Prior Publication Data

US 2026/0011853 A1 Jan. 8, 2026

Related U.S. Application Data

(63) Continuation of application No. 18/675,180, filed on May 28, 2024.

(30) Foreign Application Priority Data

Jun. 20, 2023 (CN) ........................ 202321597643.X
Feb. 4, 2024 (CN) ........................ 202410160594.6
Feb. 4, 2024 (CN) ........................ 202420281888.X

(51) Int. Cl.
*H01M 50/00* (2021.01)
*H01M 50/209* (2021.01)
(Continued)

(52) U.S. Cl.
CPC ....... *H01M 50/264* (2021.01); *H01M 50/209* (2021.01); *H01M 50/211* (2021.01);
(Continued)

(58) Field of Classification Search
CPC ............... H01M 10/63; H01M 10/643; H01M 10/6557; H01M 50/264; H01M 50/211; H01M 50/209
See application file for complete search history.

(56) References Cited

U.S. PATENT DOCUMENTS 3,056,850 A 10/1962 Rauske et al.
9,685,682 B2 6/2017 Hoshi et al.
(Continued)

FOREIGN PATENT DOCUMENTS

CN 205069810 U 3/2016
CN 107134548 A * 9/2017 ........... H01M 50/10
(Continued)

OTHER PUBLICATIONS

Flannery et al, Rechargeable Battery and Method for Manufacture of Rechargeable Battery, Feb. 2023. See the Abstract. (Year: 2023).*
(Continued)

*Primary Examiner* — Tiffany Legette
*Assistant Examiner* — Monique M Wills

(57) ABSTRACT

Provided is an energy storage power supply including a housing, a plurality of cells in a cylindrical shape, a fixing member, and a port configured to connect the energy storage power supply to an electrical device or a charging device. The housing has a plurality of cylindrical recess holes formed on an inner wall of the housing. Each of the plurality of cells has a first end and a second end opposite to the first end. The second end of each of the plurality of cells is provided with a positive electrode and a negative electrode, and the first ends of the plurality of cells is inserted in the plurality of cylindrical recess holes. The fixing member is configured to fix the second ends of the plurality of cells.

17 Claims, 15 Drawing Sheets

(51) Int. Cl.

| | |
|---|---|
| ***H01M 50/211*** | (2021.01) |
| ***H01M 50/213*** | (2021.01) |
| ***H01M 50/264*** | (2021.01) |
| ***H01M 50/291*** | (2021.01) |
| ***H01M 50/507*** | (2021.01) |
| ***H01M 50/55*** | (2021.01) |

(52) U.S. Cl.

CPC ....... *H01M 50/213* (2021.01); *H01M 50/291* (2021.01); *H01M 50/507* (2021.01); *H01M 50/55* (2021.01)

(56) References Cited

U.S. PATENT DOCUMENTS

| | | | | |
|---|---|---|---|---|
| 11,283,118 | B2 | 3/2022 | Yoo et al. | |
| 11,870,048 | B2 | 1/2024 | Thomas et al. | |
| 12,431,591 | B2 | 9/2025 | An et al. | |
| 2008/0088276 | A1 | 4/2008 | Hurst et al. | |
| 2009/0111015 | A1 | 4/2009 | Wood et al. | |
| 2010/0221590 | A1 | 9/2010 | Reber | |
| 2011/0014501 | A1 | 1/2011 | Scheucher | |
| 2011/0076521 | A1 | 3/2011 | Shimizu et al. | |
| 2011/0090614 | A1 | 4/2011 | Guerin et al. | |
| 2013/0164567 | A1 | 6/2013 | Olsson et al. | |
| 2013/0183566 | A1 | 7/2013 | Wayne et al. | |
| 2014/0210416 | A1 | 7/2014 | Aston et al. | |
| 2014/0248519 | A1 | 9/2014 | Nishikawa et al. | |
| 2016/0093926 | A1 | 3/2016 | Wright | |
| 2017/0244074 | A1 | 8/2017 | Matsui | |
| 2018/0248229 | A1 | 8/2018 | Wada et al. | |
| 2018/0277802 | A1 | 9/2018 | Sun et al. | |
| 2019/0027731 | A1 | 1/2019 | Zeng et al. | |
| 2019/0067655 | A1 | 2/2019 | Nakamura et al. | |
| 2020/0099022 | A1 | 3/2020 | Didier | |
| 2020/0227698 | A1 | 7/2020 | Muratsu et al. | |
| 2020/0243814 | A1 | 7/2020 | Kang et al. | |
| 2020/0243821 | A1 | 7/2020 | Torrey et al. | |
| 2021/0083506 | A1* | 3/2021 | Rao | G01R 21/06 |
| 2021/0280936 | A1 | 9/2021 | Dorresteyn | |
| 2022/0109211 | A1 | 4/2022 | Wang et al. | |
| 2022/0238966 | A1 | 7/2022 | Spooner | |
| 2022/0328920 | A1 | 10/2022 | Lobisser et al. | |
| 2022/0376361 | A1 | 11/2022 | An et al. | |
| 2023/0207923 | A1 | 6/2023 | Kawata et al. | |
| 2025/0023178 | A1 | 1/2025 | Yao et al. | |

FOREIGN PATENT DOCUMENTS

| | | | | | |
|---|---|---|---|---|---|
| CN | 207368039 | U | | 5/2018 | |
| CN | 212392345 | U | | 1/2021 | |
| CN | 212587564 | U | | 2/2021 | |
| CN | 112531275 | A | * | 3/2021 | H01M 10/6557 |
| CN | 214254570 | U | | 9/2021 | |
| CN | 214542391 | U | | 10/2021 | |
| CN | 216121834 | U | | 3/2022 | |
| CN | 217086711 | U | | 7/2022 | |
| CN | 217158421 | U | | 8/2022 | |
| CN | 217158577 | U | | 8/2022 | |
| CN | 218241972 | U | | 1/2023 | |
| CN | 115912545 | A | | 4/2023 | |
| CN | 219086186 | U | * | 5/2023 | |
| CN | 116742280 | A | | 9/2023 | |
| CN | 116759736 | A | | 9/2023 | |
| DE | 102007010742 | B4 | | 12/2012 | |
| DE | 102021132119 | A1 | | 6/2023 | |
| EP | 4191627 | A1 | | 6/2023 | |
| JP | H09306447 | A | | 11/1997 | |
| JP | 2008293863 | A | | 12/2008 | |
| JP | 2011076936 | A | | 4/2011 | |
| JP | 2012212628 | A | | 11/2012 | |
| JP | 201370535 | A | | 4/2013 | |
| JP | 2013525942 | A | | 6/2013 | |
| JP | 2014197516 | A | | 10/2014 | |
| JP | 2018125192 | A | | 8/2018 | |
| JP | 2018170254 | A | | 11/2018 | |
| JP | 2021136054 | A | | 9/2021 | |
| JP | 2022039181 | A | | 3/2022 | |
| RU | 2789348 | C2 | * | 2/2023 | |
| TW | M443943 | U | | 12/2012 | |
| WO | 2009118963 | A1 | | 10/2009 | |
| WO | 2013129074 | A1 | | 9/2013 | |
| WO | 2020247995 | A1 | | 12/2020 | |
| WO | 2022069910 | A1 | | 4/2022 | |
| WO | 2022120140 | A2 | | 6/2022 | |
| WO | 2023028816 | A1 | | 3/2023 | |
| WO | 2023069716 | A2 | | 4/2023 | |

OTHER PUBLICATIONS

Guo, Energy storage module, Mar. 2021, See the Abstract. (Year: 2021).*

Zhou, A battery pack, Sep. 2017. See the Abstract. (Year: 2017).*

Zhang et al, Easily Combinable Modularized Mobile Energy Storage Inverter Power Supply, May 2023, See the Abstract. (Year: 2023).*

International Search Report dated May 28, 2024 received in international Application No. PCT/CN2024/084162. English translation attached.

Written Opinion dated May 28, 2024 received in international Application No. PCT/CN2024/084162. English translation attached.

Notice of Reasons for Refusal dated Jul. 2, 2024 received in corresponding patent family application No. JP2024-092722. English translation attached.

Notice of Reasons for Refusal dated Dec. 10, 2024 received in corresponding patent family application No. JP2024-092722. English translation attached.

Notice of Reasons for Refusal dated May 27, 2025 received in corresponding patent family application No. JP2024-092722. English translation attached.

Grant Notice dated Jan. 25, 2024 received in in corresponding patent family application No. CN202321597643.X. English translation attached.

Grant Notice dated Aug. 29, 2024 received in in corresponding patent family application No. CN202420281888.X. English translation attached.

First Office Action dated Jul. 26, 2024 received in corresponding patent family application No. CN202420281877.1. English translation attached.

Second Office Action dated Sep. 11, 2024 received in corresponding patent family application No. CN202420281877.1. English translation attached.

Grant Notice dated Oct. 14, 2024 received in corresponding patent family application No. CN202420281877.1. English translation attached.

Grant Notice dated Aug. 20, 2025 received in corresponding patent family application No. CN202422612323.8. English translation attached.

Notice of Reasons for Refusal dated Mar. 3, 2026 received in corresponding patent family application No. JP2024223628. English translation attached.

Decision to Grant dated Mar. 3, 2026 received in corresponding patent family application No. JP2025133186. English translation attached.

Final Rejection dated Mar. 17, 2026 received in corresponding family U.S. Appl. No. 19/328,266.

Notice of Allowance dated Mar. 24, 2026 received in corresponding family U.S. Appl. No. 19/328,272.

Notice of Allowance dated May 20, 2026 received in corresponding family U.S. Appl. No. 18/675,180.

Notice of Reasons for Refusal dated Sep. 30, 2025 received in corresponding patent family application No. JP2024223628. English translation attached.

Notice of Reasons for Refusal dated Sep. 30, 2025 received in corresponding patent family application No. JP2025133186. English translation attached.

Non-Final Rejection dated Dec. 10, 2025 received in corresponding family U.S. Appl. No. 18/675,180.

(56) References Cited

OTHER PUBLICATIONS

Non-Final Rejection dated Nov. 25, 2025 received in corresponding family U.S. Appl. No. 19/328,266.
Non-Final Rejection dated Dec. 9, 2025 received in corresponding family U.S. Appl. No. 19/328,272.
The extended European search report dated Jun. 12, 2026 received in corresponding patent family application No. EP24824962.5.
Non-Final Rejection-dated Jul. 22, 2026 received in corresponding patent family application No. U.S. Appl. No. 19/328,266.
Decision to Grant a Patent dated Aug. 18, 2026 received in corresponding patent family application No. JP2024223628. English translation attached.
Corrected Notice of Allowability dated Aug. 5, 2026 received in corresponding patent family application No. U.S. Appl. No. 19/328,272.

* cited by examiner

ENERGY STORAGE POWER SUPPLY

CROSS-REFERENCE TO RELATED APPLICATION

The present application is a continuation of U.S. application Ser. No. 18/675,180, filed on May 28, 2024, which claims the benefit of priority of following Chinese Patent Applications:

1) Chinese Patent Application No. 202310738695.2 filed on Jun. 20, 2023;
2) Chinese Patent Application No. 202321597643.X filed on Jun. 20, 2023;
3) Chinese Patent Application No. 202410160594.6 filed on Feb. 4, 2024; and
4) Chinese Patent Application No. 202420281888.X filed on Feb. 4, 2024. The disclosures of the aforementioned applications are hereby incorporated by reference in their entireties.

FIELD

The present disclosure relates to the technical field of energy storage, and more particularly, to an energy storage power supply.

BACKGROUND

In the related art, a battery pack includes a housing and a battery module fixed to the housing through screws, etc. The battery module is assembled from cells, a cell support, a busbar, a collection plate, and a screw, etc. During the assembling of the battery pack, the battery module is first assembled using the respective parts, and then the battery module is fixed in the housing. However, such a battery pack has a number of related structural parts of different types, leading to a complex assembly process and high cost. Moreover, in order to reserve mounting space, a space utilization rate of the product is low, with a large overall product size.

SUMMARY

In a first aspect, the present disclosure provides an energy storage power supply including a housing, a plurality of cells in a cylindrical shape, a fixing member, and a port configured to connect the energy storage power supply to an electrical device or a charging device. The housing has a plurality of cylindrical recess holes formed on an inner wall of the housing. Each of the plurality of cells has a first end and a second end opposite to the first end. The second end of each of the plurality of cells is provided with a positive electrode and a negative electrode, and the first ends of the plurality of cells is inserted in the plurality of cylindrical recess holes. The fixing member is configured to fix the second ends of the plurality of cells.

In a second aspect, the present disclosure provides an energy storage power supply including a housing, a plurality of cells in a cylindrical shape, a fixing member, an inverter received in the housing and electrically connected to the cell, and a panel disposed on the housing and configured to display a quantity of electricity of the energy storage power supply. The housing has a plurality of cylindrical recess holes formed on an inner wall of the housing. Each of the plurality of cells has a first end and a second end opposite to the first end. The second end of each of the plurality of cells is provided with a positive electrode and a negative electrode, and the first ends of the plurality of cells is inserted in the plurality of cylindrical recess holes. The fixing member is configured to fix the second ends of the plurality of cells. The inverter is configured to convert a direct current generated by the cell into an alternating current.

BRIEF DESCRIPTION OF THE DRAWINGS

These and other aspects and advantages of embodiments of the present disclosure will become apparent and more readily appreciated from the following descriptions made with reference to the accompanying drawings.

Figure 1:
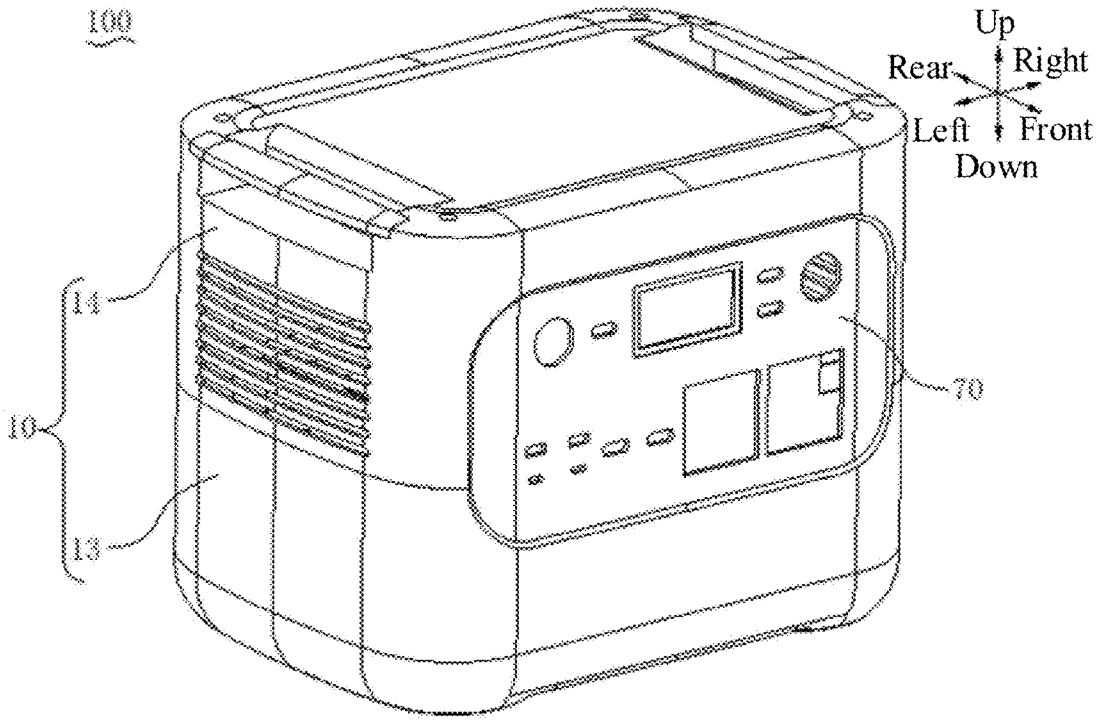
FIG. 1 is a schematic structural view of an energy storage power supply according to an embodiment of the present disclosure.

REFERENCE NUMERALS OF PRIMARY COMPONENTS energy storage power supply 100, first housing 10, accommodation chamber 11, first positioning portion 12, positioning groove 121, first casing 13, receiving groove 131, first through hole 132, second casing 14, first cell 20, soft-pack cell 21, prismatic cell 22, cylindrical cell 23, sheet-like cell 24, first electrode 231, second electrode 232, reinforcement rib 30, busbar 40, first busbar 41, second busbar 42, third busbar 43, fourth busbar 44, first collection plate 45, second collection plate 46, third collection plate 47, fourth collection plate 48, cover plate 50, sealing ring 60, panel 70, support 80;

energy storage power supply 100, second housing 101, second cell 103, fixing member 15, electrical connection member 17, collection plate 19, inverter 201, battery management system 203, main board 25, front panel 27, handle 29, foot pad 31, second positioning portion 111, receiving chamber 112, inner bottom wall 113, inner side wall 115, third casing 117, fourth casing 119, first end 1301, second end 1302, electrode 133, split support 151, screw 152, post 1131, position-limiting strip 1132, wavy side surface 1133, one-piece support 1151, third electrode 1331, fourth electrode 1332, second through hole 1511.

DETAILED DESCRIPTION

The embodiments of the present disclosure will be described in detail below with reference to examples thereof as illustrated in the accompanying drawings, throughout which same or similar elements, or elements having same or similar functions are denoted by same or similar reference numerals. The embodiments described below with reference to the drawings are illustrative only and are intended to explain rather than limit the present disclosure.

Various embodiments or examples for implementing different structures of the present disclosure are provided below. In order to simplify the description of the present disclosure, components and arrangements of specific examples are described herein. These specific examples are merely for illustration, rather than limiting the present disclosure. Further, the same reference numerals and/or reference letters may appear in different examples of the present disclosure for the purpose of simplicity and clarity, instead of indicating a relationship between different embodiments and/or the discussed arrangements. In addition, the present disclosure provides examples of various specific processes and materials. However, applications of other processes and/or the use of other materials are conceivable for those of ordinary skill in the art.

In addition, the term "first" or "second" is only for descriptive purposes, rather than indicating or implying relative importance or implicitly indicating the number of indicated technical features. Therefore, the features defined with "first" or "second" can explicitly or implicitly include at least one of the features. In the description of the present disclosure, "plurality of" means at least two, unless otherwise specifically indicated.

In the description of this specification, descriptions with reference to the terms "an embodiment", "some embodiments", "illustrative embodiments", "examples", "specific examples", or "some examples" etc., mean that specific features, structure, materials or characteristics described in conjunction with the embodiment or example are included in at least an embodiment or example of the present disclosure. In this specification, the schematic representations of the above terms do not necessarily refer to the same embodiment or example. Moreover, the described specific features, structures, materials, or characteristics may be combined in any one or more embodiments or examples in a suitable manner.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "counterclockwise", etc., are based on the orientation or position relationship shown in the drawings, and is only for the convenience of describing the present disclosure and simplifying the description, rather than indicating or implying that the associated device or element must have a specific orientation, or be constructed and operated in a specific orientation, and therefore cannot be understood as a limitation on the present disclosure.

In the present disclosure, unless otherwise clearly specified and limited, the first characteristic is "on" or "under" the second characteristic refers to the first characteristic and the second characteristic can be direct or via another characteristic indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, it should be noted that unless otherwise clearly specified and limited, terms such as "installed", "mounted", "connected", "coupled" should be understood in a broad sense. For example, it may be a fixed connection or a detachable connection or connection as one piece; mechanical connection or electrical connection; direct connection or indirect connection through an intermediate; internal communication of two components or the interaction relationship between two components. For those of ordinary skill in the art, the specific meaning of the above-mentioned terms in the present disclosure can be understood according to specific circumstances.

The present disclosure provides an energy storage power supply, which aims to solve at least one of the above problems.

In a first aspect, the present disclosure provides an energy storage power supply including a housing, a plurality of cells in a cylindrical shape, a fixing member, and a port configured to connect the energy storage power supply to an electrical device or a charging device. The housing has a plurality of cylindrical recess holes formed on an inner wall of the housing. Each of the plurality of cells has a first end and a second end opposite to the first end. The second end of each of the plurality of cells is provided with a positive electrode and a negative electrode, and the first ends of the plurality of cells is inserted in the plurality of cylindrical recess holes. The fixing member is configured to fix the second ends of the plurality of cells.

In an embodiment of the energy storage power supply according to the first aspect of the present disclosure, the energy storage power supply further includes a busbar configured to electrically connect the plurality of cells.

In an embodiment of the energy storage power supply according to the first aspect of the present disclosure, a plurality of busbars are provided, the plurality of busbars being arranged above the fixing member and configured to connect electrodes of adjacent cells among the plurality of cells.

In an embodiment of the energy storage power supply according to the first aspect of the present disclosure, the fixing member has a plurality of through holes, the plurality of through holes exposing the second ends of the plurality of cells to enable the busbar to electrically connect the plurality of cells.

In an embodiment of the energy storage power supply according to the first aspect of the present disclosure, the energy storage power supply further includes a collection plate configured to collect state information of the plurality of cells, the collection plate being electrically connected to the busbar.

In an embodiment of the energy storage power supply according to the first aspect of the present disclosure, the housing has a plurality of position-limiting strips formed on an inner bottom wall of the housing, each of the plurality of position-limiting strips including a wavy side surface, and the plurality of cylindrical recess holes being defined by adjacent wavy side surfaces.

In an embodiment of the energy storage power supply according to the first aspect of the present disclosure, the housing has a one-piece support formed on an inner side wall of the housing, the plurality of cylindrical recess holes being defined by the inner side wall of the housing and the one-piece support.

In an embodiment of the energy storage power supply according to the first aspect of the present disclosure, the housing has a plurality of posts formed on an inner bottom wall of the housing, the plurality of posts being arranged in an array to define the plurality of cylindrical recess holes.

In an embodiment of the energy storage power supply according to the first aspect of the present disclosure, the housing includes a first casing and a second casing. The first casing and the second casing are detachably connected to each other and define a receiving chamber, the plurality of cells being disposed in the receiving chamber, and the plurality of cylindrical recess holes being formed on the first casing or the second casing.

In an embodiment of the energy storage power supply according to the first aspect of the present disclosure, the energy storage power supply further includes a panel disposed on the housing. The panel is configured to display a quantity of electricity of the energy storage power supply.

In an embodiment of the energy storage power supply according to the first aspect of the present disclosure, the energy storage power supply further includes a panel disposed on the housing. The port is formed on the panel.

In an embodiment of the energy storage power supply according to the first aspect of the present disclosure, the energy storage power supply further includes an inverter received in the housing and electrically connected to the plurality of cells. The inverter is configured to convert a direct current generated by the plurality of cells into an alternating current.

In a second aspect, the present disclosure provides an energy storage power supply including a housing, a plurality of cells in a cylindrical shape, a fixing member, an inverter received in the housing and electrically connected to the cell, and a panel disposed on the housing and configured to display a quantity of electricity of the energy storage power supply. The housing has a plurality of cylindrical recess holes formed on an inner wall of the housing. Each of the plurality of cells has a first end and a second end opposite to the first end. The second end of each of the plurality of cells is provided with a positive electrode and a negative electrode, and the first ends of the plurality of cells is inserted in the plurality of cylindrical recess holes. The fixing member is configured to fix the second ends of the plurality of cells. The inverter is configured to convert a direct current generated by the cell into an alternating current.

In an embodiment of the energy storage power supply according to the second aspect of the present disclosure, the energy storage power supply further includes a busbar configured to electrically connect the plurality of cells.

In an embodiment of the energy storage power supply according to the second aspect of the present disclosure, a plurality of busbars are provided, the plurality of busbars being arranged above the fixing member and configured to connect electrodes of adjacent cells among the plurality of cells.

In an embodiment of the energy storage power supply according to the second aspect of the present disclosure, the fixing member has a plurality of through holes, the plurality of through holes exposing the second ends of the plurality of cells to enable the busbar to electrically connect the plurality of cells.

In an embodiment of the energy storage power supply according to the second aspect of the present disclosure, the energy storage power supply further includes a collection plate configured to collect state information of the plurality of cells, the collection plate being electrically connected to the busbar.

In an embodiment of the energy storage power supply according to the second aspect of the present disclosure, the housing has a plurality of position-limiting strips formed on an inner bottom wall of the housing, each of the plurality of position-limiting strips including a wavy side surface, and the plurality of cylindrical recess holes being defined by adjacent wavy side surfaces.

In an embodiment of the energy storage power supply according to the second aspect of the present disclosure, the housing has a one-piece support formed on an inner side wall of the housing, the plurality of cylindrical recess holes being defined by the inner side wall of the housing and the one-piece support.

In an embodiment of the energy storage power supply according to the second aspect of the present disclosure, the housing has a plurality of posts formed on an inner bottom wall of the housing, the plurality of posts being arranged in an array to define the plurality of cylindrical recess holes.

In an embodiment of the energy storage power supply according to the second aspect of the present disclosure, the housing includes a first casing and a second casing. The first casing and the second casing are detachably connected to each other and define a receiving chamber, the plurality of cells being disposed in the receiving chamber, and the plurality of cylindrical recess holes being formed on the first casing or the second casing.

In an embodiment of the energy storage power supply according to the second aspect of the present disclosure, the energy storage power supply further includes a port configured to connect the energy storage power supply to an electrical device or a charging device.

In an embodiment of the energy storage power supply according to the second aspect of the present disclosure, the port is formed on the panel.

Additional aspects and advantages of the embodiments of present disclosure will be provided at least in part in the following description, or will become apparent in part from the following description, or can be learned from the practice of the embodiments of the present disclosure.

Figure 2:
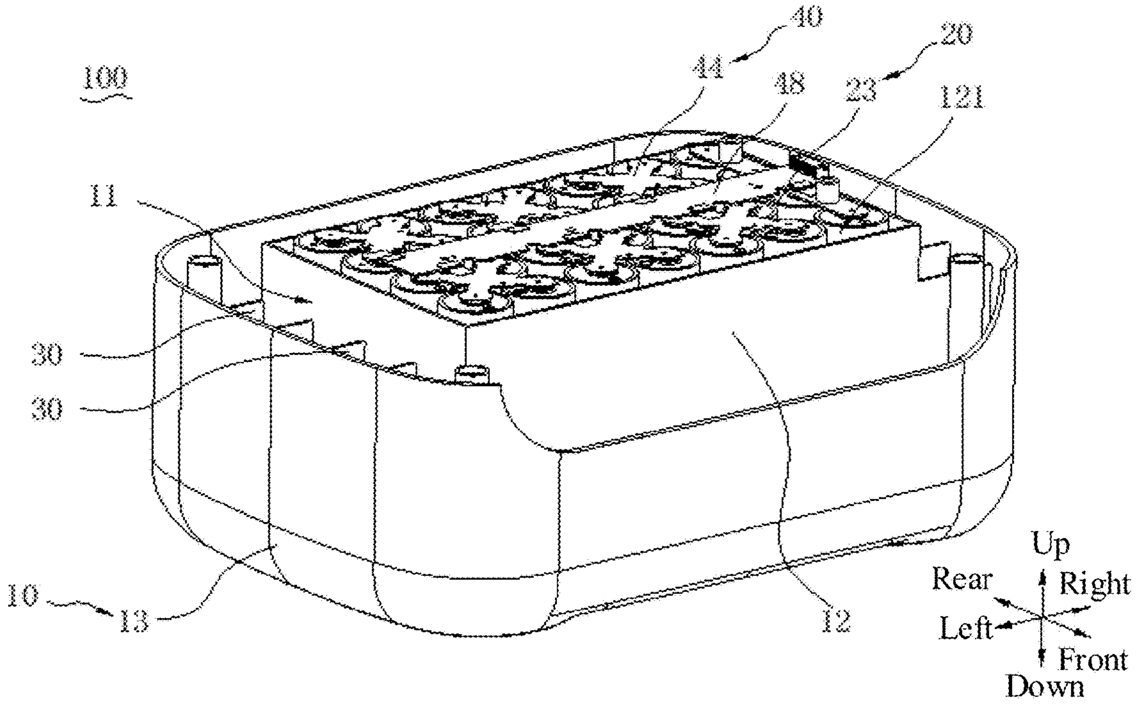
FIG. 2 is a schematic view of an internal structure of an energy storage power supply according to an embodiment of the present disclosure.

Referring to FIG. 1 and FIG. 2, an energy storage power supply 100 according to an embodiment of the present disclosure includes a first housing 10, a fixing colloid, and at least one first cell 20. The first housing 10 has an accommodation chamber 11 defined inside the first housing 10. The accommodation chamber 11 is provided with a positioning portion 12. The first positioning portion 12 has a positioning groove 121. The at least one first cell 20 is accommodated in the positioning groove 121. The fixing colloid is located in the positioning groove 121 and fixedly connected to the first cell 20 and a side wall of the positioning groove 121.

In the above energy storage power supply 11, the first positioning portion 12 is arranged at an inner wall of the accommodation chamber, the positioning groove 121 is defined in the first positioning portion 12, the at least one first cell 20 is accommodated in the positioning groove 121 and fixed by the first positioning portion 12 and the fixing colloid. In this way, the first cell 20 can be directly mounted in the positioning groove 121, rather than being assembled as a battery module and then mounted into the first housing 10, thereby reducing the assembly process and cost. Furthermore, the parts required to assemble the battery module can also be reduced, thereby improving a space utilization rate of the product and reducing a product size.

In an embodiment, at least part of the first housing 10 of the energy storage power supply 100 forms an accommodation chamber 11. A first positioning portion 12 is accommodated in the accommodation chamber 11. The first positioning portion 12 is arranged at a bottom of the energy storage power supply 100 and fixedly connected to a bottom wall of the accommodation chamber 11. The first positioning portion 12 forms a positioning groove 121 configured to accommodate the first cell 20. A number of first cells 20 is not limited herein and may be determined based on a battery capacity required for the energy storage power supply 100. After the first cells 20 are orderly arranged in the positioning groove 121, the fixing colloid can be injected into the positioning groove 121, and after the fixing colloid is cured, the connection between the first cells 20 and the first positioning portion 12 is completed. The fixing colloid can connect the first cells 20 and the first positioning portion 12 as a whole by utilizing the gap between the first cells 20, without requiring other connection members. Therefore, the number of parts can be reduced to optimize the product structure and assembly process as well as to improve volume energy density and mass energy density of the product, thereby reducing the cost and improving the portability of the product. In another embodiment, the first positioning portion 12 may be arranged elsewhere in the energy storage power supply 100 and fixedly connected to a top wall or a side wall of the accommodation chamber 11. In yet another embodiment, some of the first cells 20 may be accommodated in the first positioning portion 12, or all of the first cells 20 may be accommodated in the first positioning portion 12.

Figure 3:
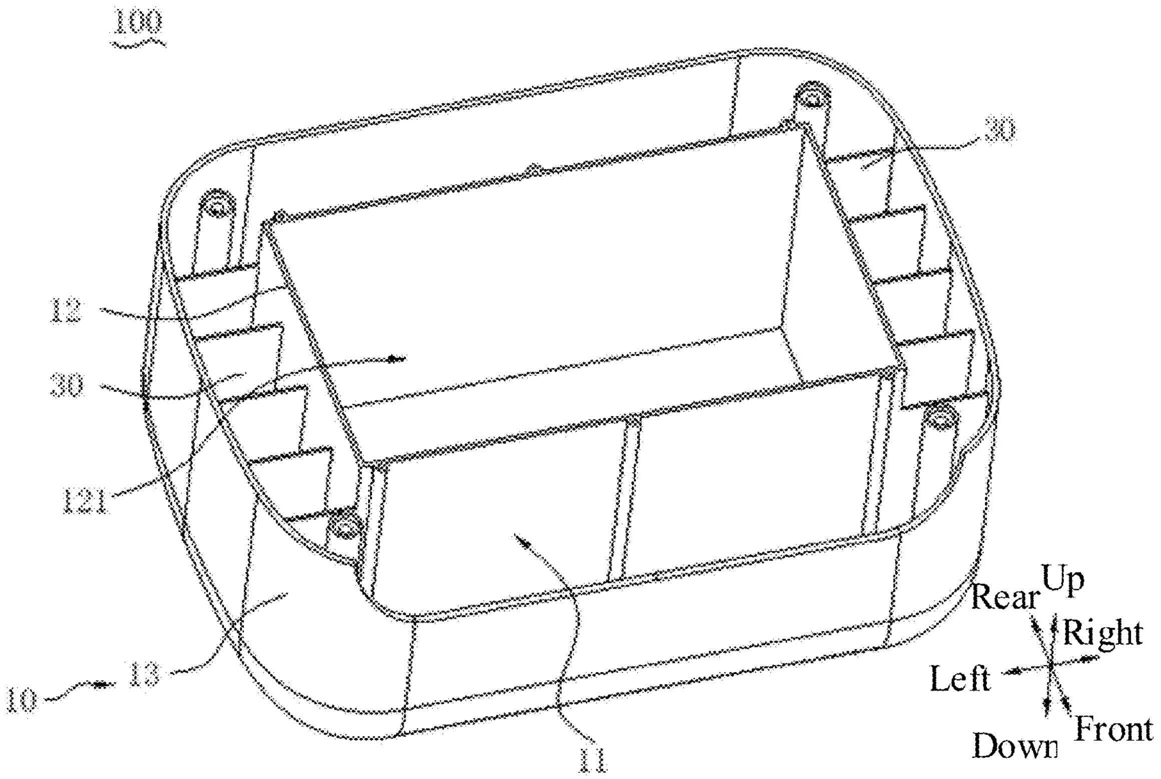
FIG. 3 is a schematic structural view of a first housing according to an embodiment of the present disclosure.

Referring to FIG. 2 and FIG. 3, in some embodiments, the energy storage power supply 100 includes a reinforcement rib 30 connecting a side wall of the first positioning portion 12 with a side wall of the accommodation chamber 11.

In this way, structural strength of the first positioning portion 12 and structural strength of the first housing 10 can be improved.

Referring to FIG. 2 and FIG. 3, in an embodiment, the reinforcement rib 30 may have a plate-like structure. Two sides of the plate-like reinforcement rib 30 are connected to the first positioning portion 12 and the first housing 10 respectively, and therefore the first positioning portion 12 and the first housing 10 are formed integrally to reduce shaking of the first positioning portion 12. It can be understood that in order to reduce a weight of the reinforcement rib 30, the reinforcement rib 30 may be in other shapes or has holes at a surface of the reinforcement rib 30 or has a hollow structure. The reinforcement rib 30 may be made of the same material as the first positioning portion 12 and the first housing 10 and connected to the first positioning portion 12 and the first housing 10 through welding. The reinforcement rib 30, the first positioning portion 12, and the first housing 10 may be made of steel, copper, aluminum, or the like. The reinforcement rib 30 may be arranged at two opposite sides of the first positioning portion 12, or may be arranged around the first positioning portion 12 to strengthen a fixing effect. In addition, the reinforcement rib 30 may include a vertical reinforcement rib 30 or a transverse reinforcement rib 30, thereby reducing deformation of the first housing 10 or deformation of the first positioning portion 12 due to impact or a temperature change.

In some embodiments, the fixing colloid includes a structural adhesive.

In this way, the safety of the first cells 20 can be improved.

In an embodiment, the structural adhesive can withstand relatively large loads. By injecting the structural adhesive into the positioning groove 121, impact resistance of the first cells 20 can be enhanced. When the first housing 10 of the energy storage power supply 100 suffers damage that directly impacts the first cells 20, the structural adhesive can withstand a part of an impact force and meanwhile can transmit the impact force to the overall first cells 20 to reduce the impact damage. In addition, the structural adhesive has good corrosion resistance. When an electrolyte leaks out of the first cells 20 due to structural damage of some of the first cells 20 or the electrolyte is ejected from an explosion-proof valve (not shown) of the first cells 20 due to thermal runaway, the structural adhesive can prevent further leakage of the electrolyte and corrosion of other of the first cells 20 or other structural components. At the same time, the structural adhesive can also have good thermal conductivity, and therefore heat generated by the first cells 20 is transferred to the first positioning portion 12 and the first housing 10, which helps to lower an operation temperature of the first cells 20.

Figure 4:
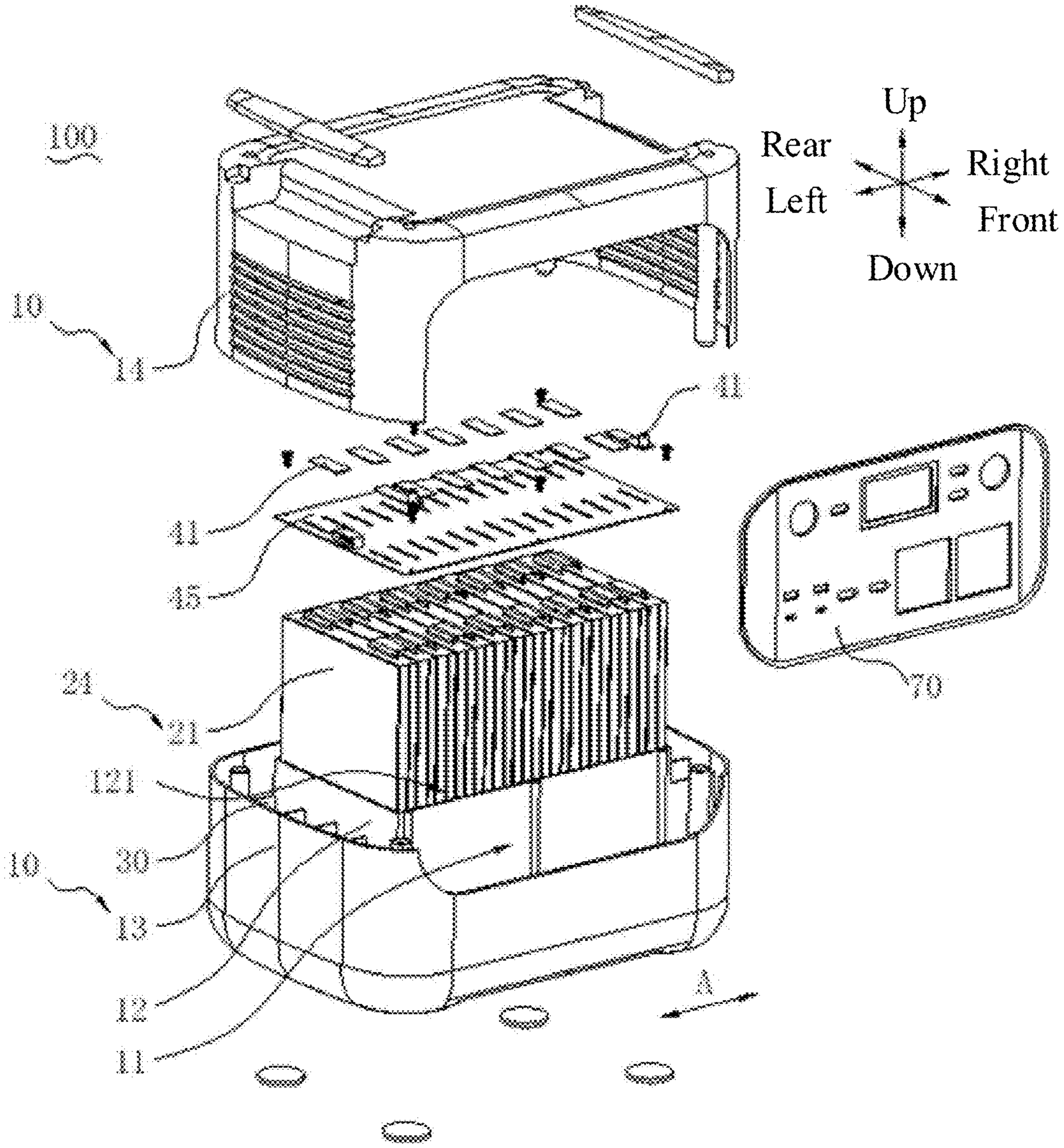
FIG. 4 is an exploded schematic view of an energy storage power supply according to an embodiment of the present disclosure.
Figure 5:
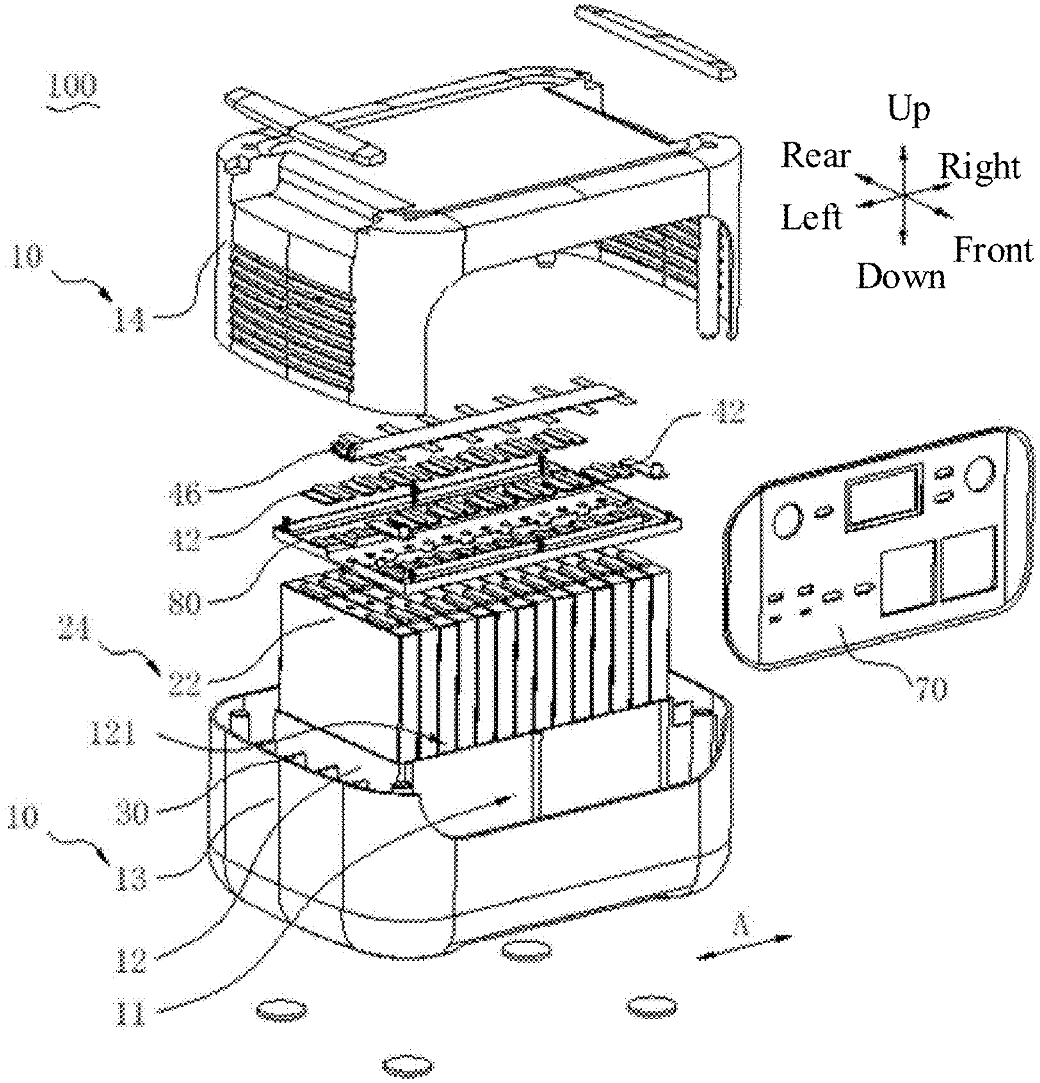
FIG. 5 is another exploded schematic view of an energy storage power supply according to an embodiment of the present disclosure.

Referring to FIG. 4 and FIG. 5, in some embodiments, the at least one cell 20 includes a plurality of sheet-like cells 24 stacked to each other.

In this way, energy density of the first cell 20 can be increased.

Referring to FIG. 4, in an embodiment, the sheet-like cell 24 may be a soft-pack cell 21 with an aluminum-plastic film or a steel-plastic film, which thus can reduce a thickness of a shell and increase the energy density of a single cell 20. Also, when a safety hazard occurs, the shell of the soft-pack cell 21 can also release an internal stress by bulging or cracking, thereby improving the safety of the soft-pack cell 21. The soft-pack cells 21 each may have a width matched with a width of the first positioning portion 12 and are stacked to each other in a length direction A. In other embodiments, the soft-pack cell 21 may have a width approximately half of a width of the first positioning portion 12, and therefore two rows of soft-pack cells 21 may be placed side by side inside the positioning groove 121 while reserving gaps for accommodating the fixing colloid.

In addition, as illustrated in FIG. 5, in another embodiment, the sheet-like cell 24 may be a prismatic cell 22 has a shell made of aluminum alloy, stainless steel, or the like. The prismatic cell 22 has high structural strength and good mechanical load-bearing capacity. The prismatic cells 22 each may also have a width matched with a width of the first positioning portion 12 and are stacked in a length direction A.

Referring to FIG. 4 and FIG. 5, in some embodiments, the first cell 20 includes two electrodes located at the same side of the first cell 20.

In this way, the structure of the energy storage power supply 100 can be simplified.

Referring to FIG. 4 and FIG. 5, in some embodiments, the electrodes of the first cell 20 are terminals for outputting or inputting electric energy. Each first cell 20 includes a positive electrode and a negative electrode that are both disposed at the top, bottom, or other side surfaces of the first cell 20. When the energy storage power supply 100 includes two or more cells 20, the electrodes of each cell 20 are arranged on the top side surface, bottom side surface, or other side surfaces of the first cell 20, and therefore the electrodes of all the first cells 20 can be connected only at one same side surface of the first positioning portion 12. Thus, the required connection space is smaller based on the more centralized connection mode, thereby facilitating the simplifying of the structure of the energy storage power supply 100. As illustrated in FIG. 4, in an embodiment, the first cell 20 may be a soft-pack cell 21. Two electrodes of each soft-pack cell 21 are disposed on the top surface. The energy storage power supply 100 includes a first busbar 41. The first busbar 41 is connected to electrodes of the same polarity of two adjacent soft-pack cells 21 at the top surface of the soft-pack cell 21 to allow the two soft-pack cells 21 to be connected in parallel to output electric energy. A plurality of first busbars 41 may be connected in series or in parallel to output or input the electric energy. The first busbar 41 may be made of copper, aluminum, nickel, or an alloy material. After the first busbar 41 is fixed to the correct position by means of tool, the first busbar 41 may be welded to the electrodes of the soft-pack cell 21 through laser welding. It should be understood that the electrical connection between the first busbar 41 and the electrodes of the soft-pack cell 21 may also be realized by other connection methods such as twisting or pressing.

In addition, the energy storage power supply 100 may collect state information of each soft-pack cell 21 by means of a first collection plate 45, which includes information such as a voltage, a current, and a temperature of each soft-pack cell 21. After the first busbar 41 is welded, the first collection plate 45 can be fixed to a corresponding position on the first busbar 41 by a screw. After the first collection plate 45 is fixed, a nickel strip of the first collection plate 45 may be electrically connected to the first busbar 41 through laser welding, thereby realizing the electrical connection between the first collection plate 45 and the first busbar 41.

As illustrated in FIG. 5, in another embodiment, the first cell 20 may also be a prismatic cell 22. Two electrodes of the prismatic cell 22 are also arranged on the top surface. The energy storage power supply 100 includes a support 80. The support 80 includes position-limiting grooves and arranged at the top of the prismatic cell 22 to allow the two electrodes of the prismatic cell 22 to pass through the position-limiting grooves. The support 80 may be made of a plastic, thereby avoiding a short circuit caused by an electrical connection of the two electrodes of one prismatic cell 22 through the support 80. The energy storage power supply 100 further includes a second busbar 42 and a second collection plate 46. After the electrodes of the prismatic cells 22 are positioned by the support 80, one second busbar 42 may connect the electrodes of two adjacent prismatic cells 22 and the second collection plate 46 is connected to the second busbars 42. The second busbar 42 and the first busbar 41, as well as the second collection plate 46 and the first collection plate 45 have similar characteristics and functions, and details thereof are not described herein.

Referring to FIG. 6 to FIG. 9, in some embodiments, the at least one cell 20 includes a plurality of cylindrical cells 23.

The positioning groove 121 has first through holes 132 defined at a bottom wall of the positioning groove 121. The electrode located at the bottom of the cylindrical cell 23 passes through the first through hole 132. The energy storage power supply 100 includes a plurality of busbars 40 configured to connect the plurality of cylindrical cells 23 in series and/or in parallel.

In this way, the safety of the first cells 20 can be improved.

Referring to FIG. 6 to FIG. 9, in an embodiment, the two electrodes of the cylindrical cell 23 are arranged at two ends of the cylindrical cell 23, and the two electrodes may be distinguished as a first electrode 231 and a second electrode 232 respectively. The first electrode 231 and the second electrode 232 are current interfaces configured to power or charge the cylindrical cell 23. The first electrode 231 may be a positive electrode and arranged at the bottom of the cylindrical cell 23, and the second electrode 232 may be a negative electrode and arranged at the top of the cylindrical cell 23. In an embodiment, the polarities and the positions of the first electrode 231 and the second electrode 232 may also be interchanged. The plurality of busbars 40 may be classified into a third busbar 43 and a fourth busbar 44. The first electrode 231 may pass through the first through hole 132 and be electrically connected to the first electrode 231 of a cylindrical cell 23 adjacent to the first electrode 231 through the third busbar 43. The second electrode 232 may be electrically and directly connected to the second electrode 232 of the cylindrical cell 23 adjacent to the second electrode 232 through the fourth busbar 44. The third busbar 43 may be electrically connected to four or more first electrodes 231. Likewise, the fourth busbar 44 may be electrically connected to four or more second electrodes 232. In another embodiment, the energy storage power supply 100 includes a third collection plate 47 and a fourth collection plate 48. The third collection plate 47 is connected to the third busbar 43, and the fourth collection plate 48 is connected to the fourth busbar 44, such that state information of each cylindrical cell 23 can be collected through the third collection plate 47 and the fourth collection plate 48. The third busbar 43, the fourth busbar 44, and the first busbar 41 have similar characteristics and functions, and the third collection plate 47, the fourth collection plate 48, and the first collection plate 45 have similar characteristics and functions, which are not described in detail herein.

Figure 6:
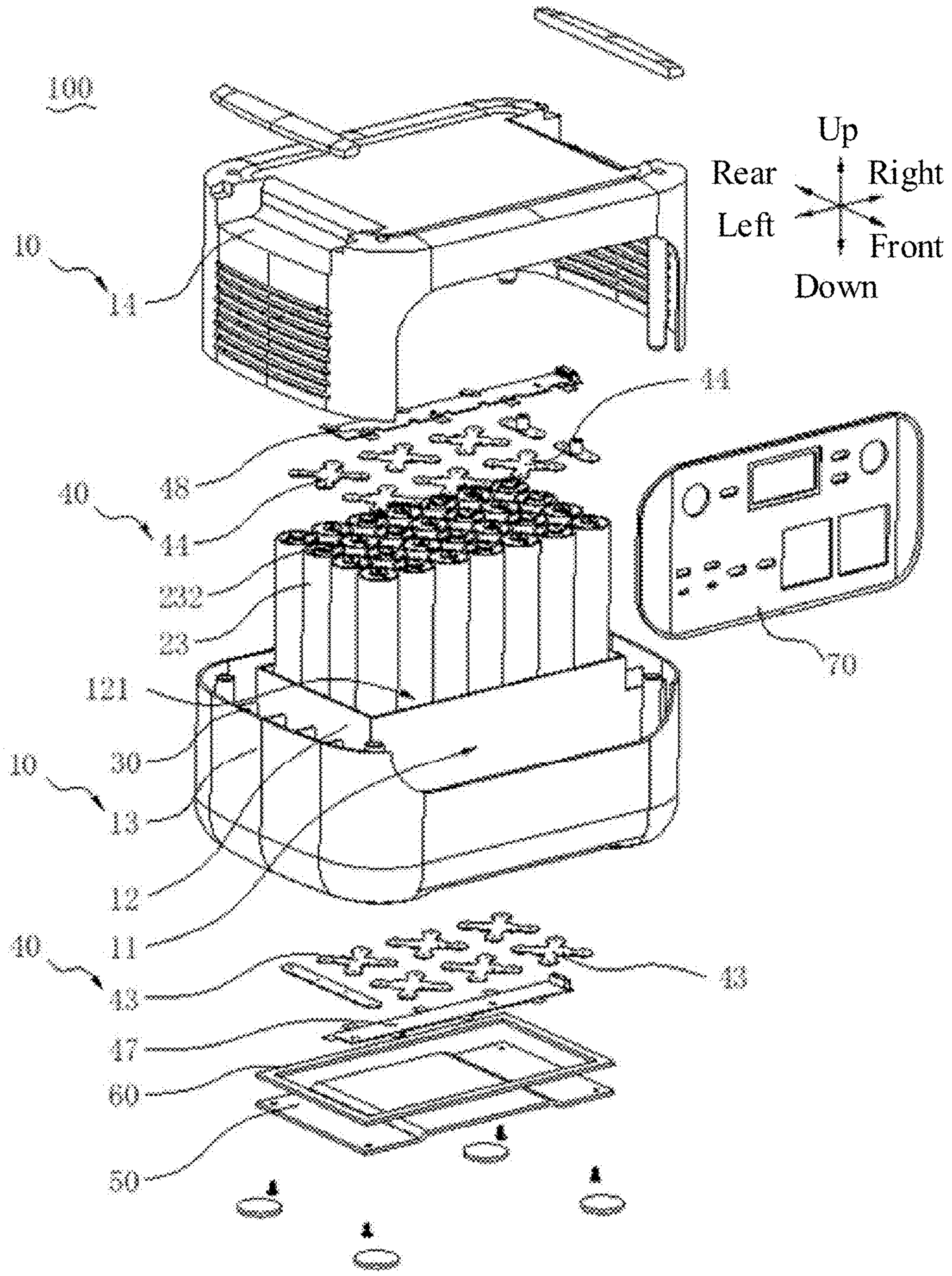
FIG. 6 is yet another exploded schematic view of an energy storage power supply according to an embodiment of the present disclosure.
Figure 7:
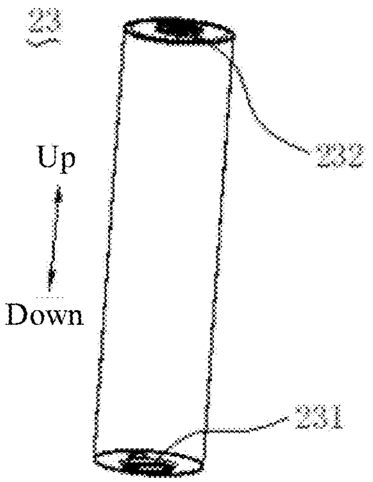
FIG. 7 is a schematic structural view of a cylindrical cell according to an embodiment of the present disclosure.
Figure 8:
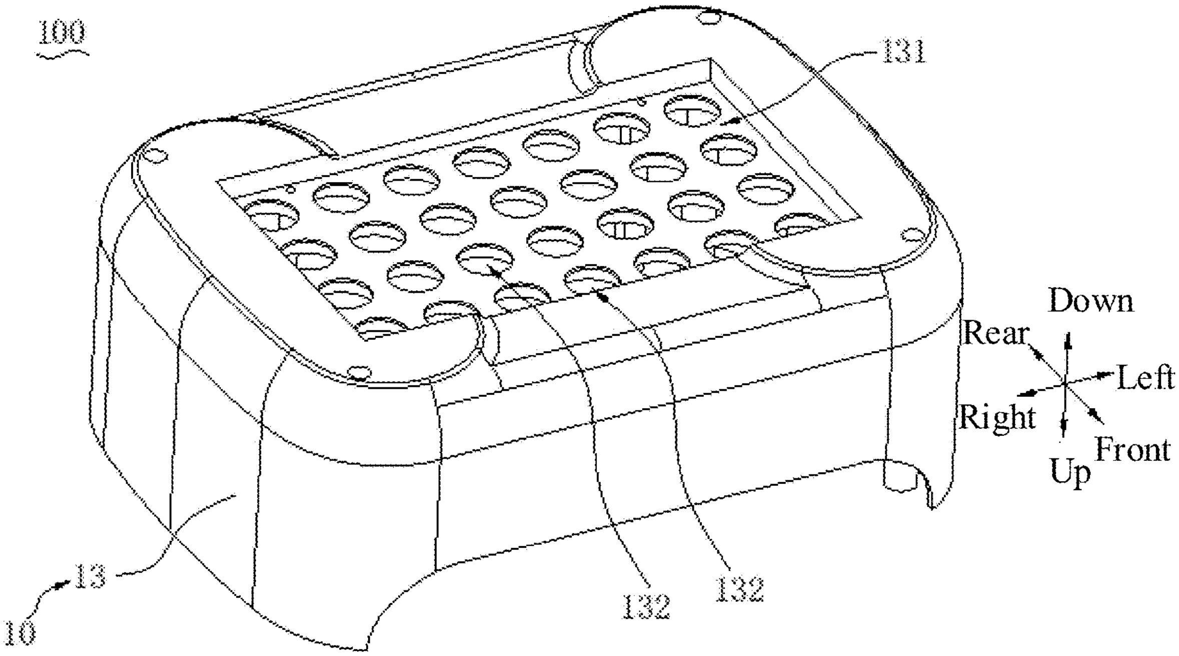
FIG. 8 to FIG. 10 are some schematic structural views of a first casing according to an embodiment of the present disclosure.

Referring to FIG. 6 and FIG. 8, in some embodiments, the energy storage power supply 100 further includes a cover plate 50. The housing has a receiving groove 131 defined at an outer wall surface of the first housing 10 and corresponding to the first positioning portion 12. The first through holes 132 pass through a bottom wall of the receiving groove 131. Some busbars 40 are located in the receiving groove 131. The cover plate 50 is arranged at the outer wall surface of the first housing 10 and covers the receiving groove 131.

In this way, the volume of the product can be advantageously reduced.

Referring to FIG. 6 and FIG. 8, in an embodiment, the cylindrical cell 23 is vertically accommodated in the positioning groove 121. An outer wall surface at a bottom of the first housing 10 is recessed inward to form a receiving groove 131. The first electrode 231 of the cylindrical cell 23 passes through the first through hole 132 to enter the receiving groove 131. The plurality of busbars 40 includes third busbars 43. The third busbar 43 may be connected to the first electrode 231 in the receiving groove 131. In this way, the first electrode 231 and the third busbar 43 can be integrated at the bottom of the first housing 10, thereby improving overall integration to reduce the product volume.

By arranging the cover plate 50 to cover the receiving groove 131, the integrity of the first housing 10 can be further improved, and the first electrode 231 and the third busbar 43 are protected. The cover plate 50 is fixed to the first housing 10 by a bolt or by other means, which is not limited herein. In another embodiment, the energy storage power supply 100 includes a third collection plate 47, which may be connected to the third busbar 43 in the receiving groove 131.

Referring to FIG. 6, in some embodiments, the energy storage power supply 100 further includes a thermal conductive adhesive connected to the cover plate 50 and the busbar 40.

In this way, a temperature of busbar 40 can be reduced.

Referring to FIG. 6, in an embodiment, the plurality of busbars 40 includes third busbars 43. When a current flows through the third busbar 43, a certain current loss occurs and heat is generated. The accumulated heat causes a temperature of the third busbar 43 and the temperature of the cylindrical cell 23 to rise, leading to fire and other safety hazards. Therefore, by filling the heat conductive adhesive between the third busbar 43 and the cover plate 50, the heat of the third busbar 43 can be transferred to the cover plate 50. Thus, the heat can be dissipated to a surrounding environment through the cover plate 50 to achieve an effect of cooling the third busbar 43 and the cylindrical cell 23. The cover plate 50 may be made of aluminum, thereby providing a better heat transfer effect. At the same time, the first housing 10 can also be made of aluminum and other materials with a good heat transfer effect, to further transfer the heat of the cover plate 50 to the first housing 10, and thus to improve the effect of cooling the third busbar 43 and the cylindrical cell 23.

Referring to FIG. 6, in some embodiments, the energy storage power supply 100 further includes a sealing ring 60 connected to the cover plate 50 and the outer wall surface of the first housing 10 in a sealed manner.

In this way, a sealing effect of the receiving groove 131 can be improved.

Referring to FIG. 6, in an embodiment, the housing has a receiving groove 131 formed at an outer wall surface of the first housing 10. A busbar 40 is accommodated in the receiving groove 131. In a humid operating environment, the poor sealing effect of the receiving groove 131 may lead to moisture infiltration into the receiving groove 131, and the infiltrated moisture can cause corrosion or even a short circuit in the busbar 40. Therefore, when the receiving groove 131 is covered by the cover plate 50, the sealing ring 60 may be arranged between the cover plate 50 and the outer wall of the first housing 10 to enhance the sealing effect on the receiving groove 131, and further to isolate the busbar 40 in the receiving groove 131 from the moisture in the ambient environment.

Referring to FIG. 1, FIG. 2, FIG. 8, FIG. 9, and FIG. 10, in some embodiments, the first housing 10 includes a first casing 13 and a second casing 14. The first casing 13 and the second casing 14 are detachably connected to each other and define the accommodation chamber 11 together. The first positioning portion 12 is arranged at the first casing 13 or the second casing 14.

In this way, mounting or repair is facilitated.

Figure 9:
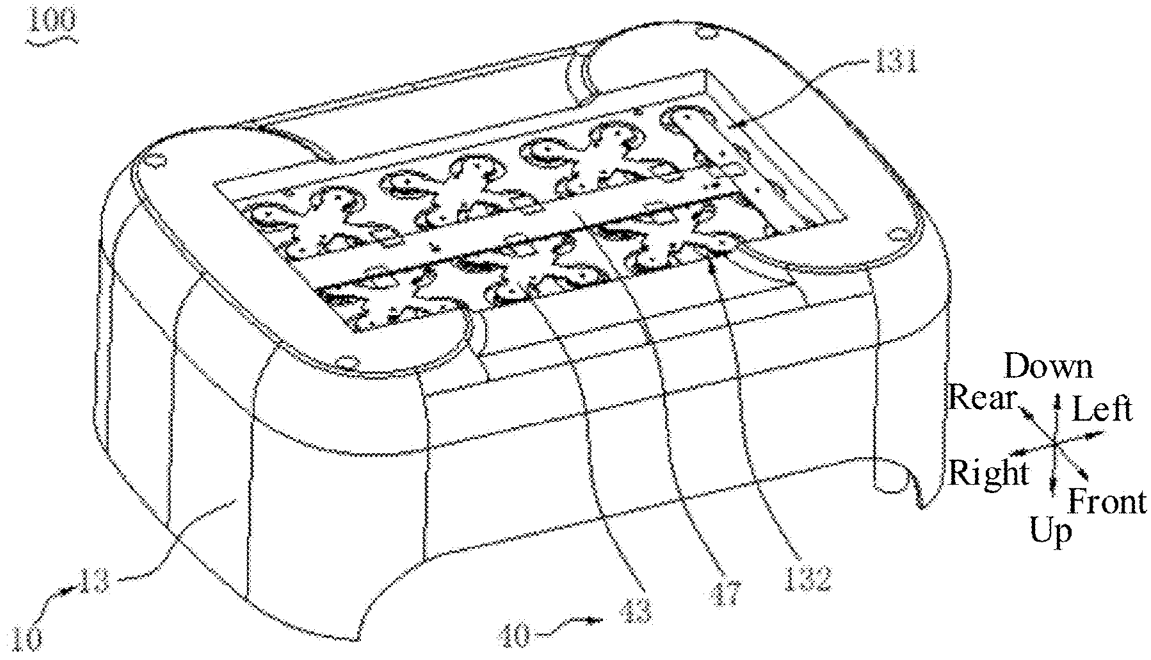
Figure 10:
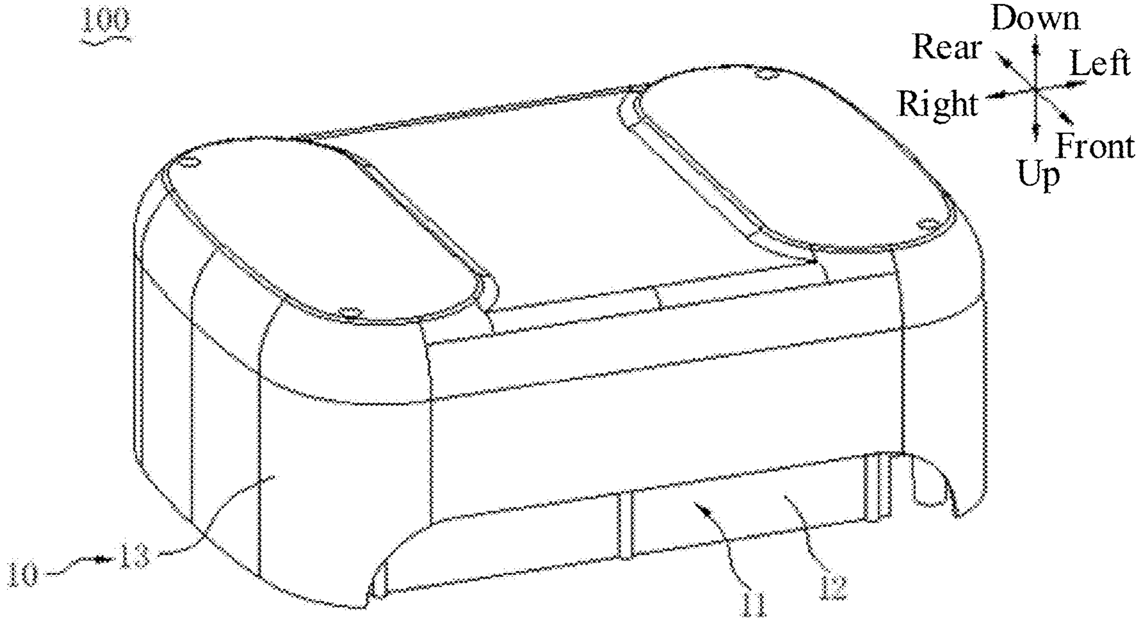

In an embodiment, FIG. 2, FIG. 8, and FIG. 9 are schematic structural views of a first casing 13 according to an embodiment, in which the first cell 20 is a cylindrical cell 23. FIG. 10 is a schematic structural view of a first casing 13 according to an embodiment, in which the first cell 20 is a soft-pack cell 21 or a prismatic cell 22. Referring to FIG. 1, FIG. 2, FIG. 8, FIG. 9, and FIG. 10, In an embodiment, the first housing 10 includes a first casing 13 located at an upper portion and a second casing 14 located at a lower portion. In some embodiments, the first casing 13 and the second casing 14 may also be located at a front part and a rear part of the first housing 10 or a left part and a right part of the first housing 10, or the first casing 13 and the second casing 14 may be arranged at two opposite corners of the first housing 10. The first casing 13 and the second casing 14 may be detachably connected to each other through threads, snap-fitting, or clamp. The first casing 13 and the second casing 14 define the accommodation chamber 11 to accommodate the first cell 20. Thus, convenience of assembly or disassembly for maintenance can be increased.

In addition, referring to the FIG. 1, in some embodiments, the energy storage power supply 100 may further include a panel 70 disposed on the first housing 10. The panel 70 can display current information of the energy storage power supply 100 such as a charge level and a battery temperature. The panel 70 further includes a port of the energy storage power supply 100 configured to connect the energy storage power supply 100 to an electrical device or a charging device, such that the first cell 20 may power the electrical device or be charged by the charging device.

In the related art, two battery supports are generally used to fix the two ends of the cell, the corresponding electrical connectors, and the corresponding collection plates to form a battery pack which is then mounted into the cell, thereby resulting in numerous spare parts, large size, high cost, and complicated mounting procedures for the energy storage power supply. On the other hand, since the housing is required to reserve space for mounting the battery pack, the volume of the energy storage power supply is further increased.

Figure 11:
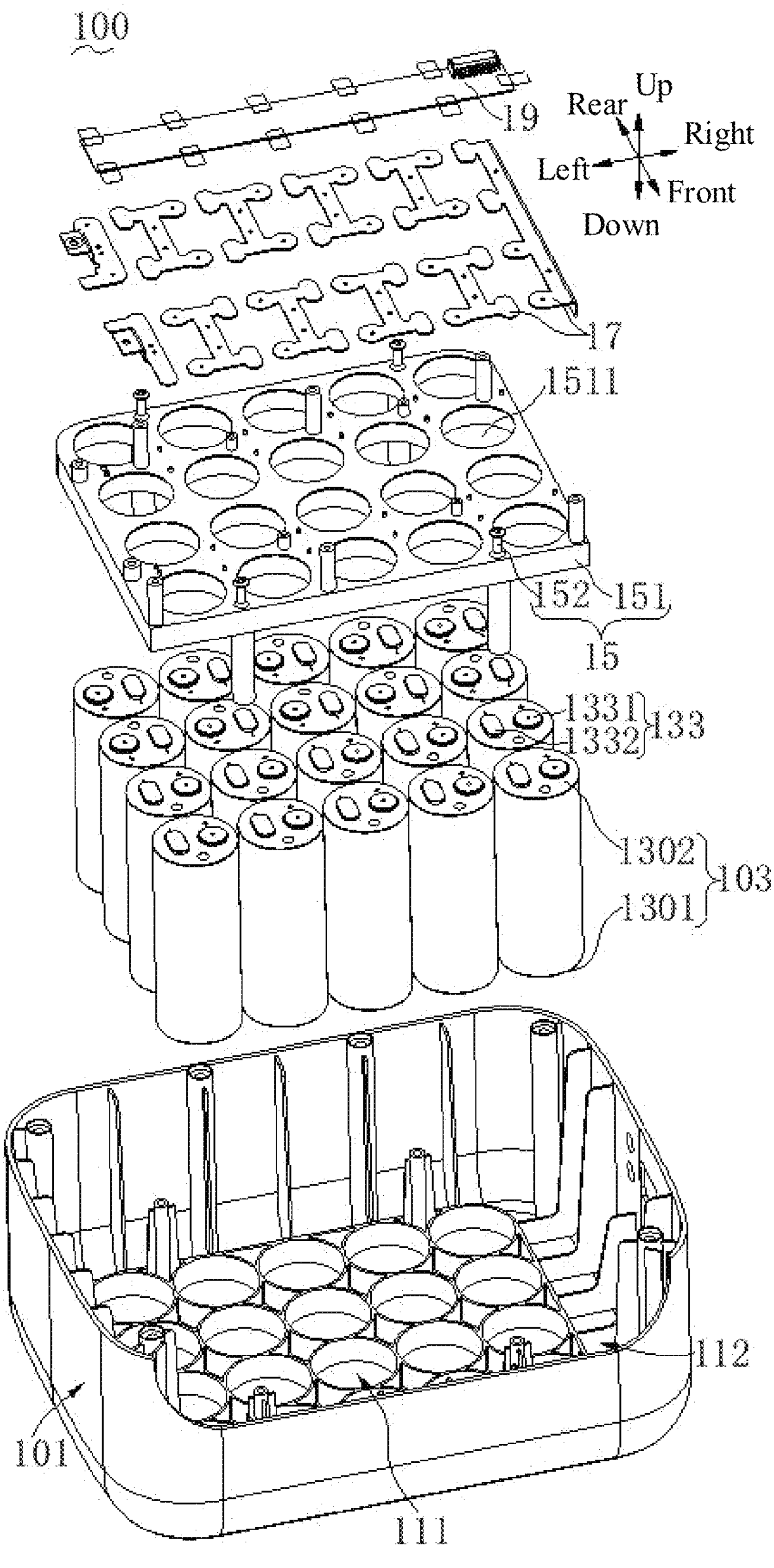
FIG. 11 is a perspective exploded view illustrating an energy storage power supply according to an embodiment of the present disclosure.
Figure 12:
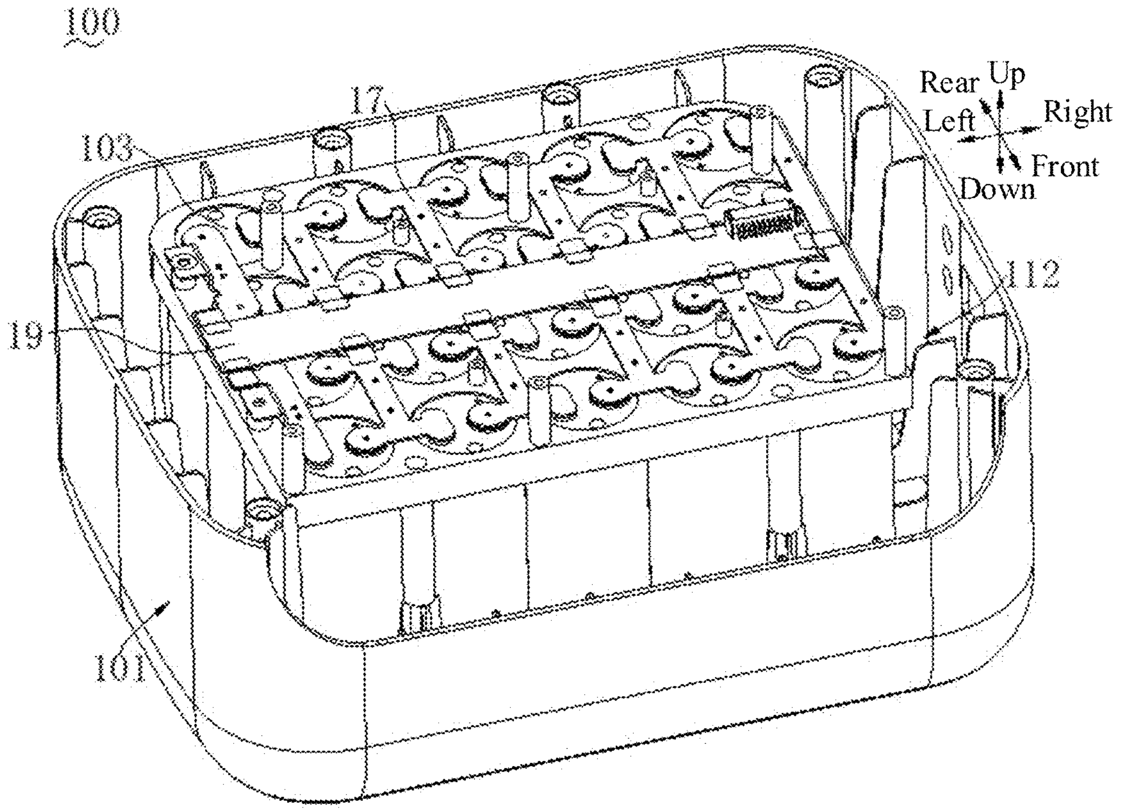
FIG. 12 to FIG. 13 are perspective exploded schematic views of an energy storage power supply according to an embodiment of the present disclosure.
Figure 13:
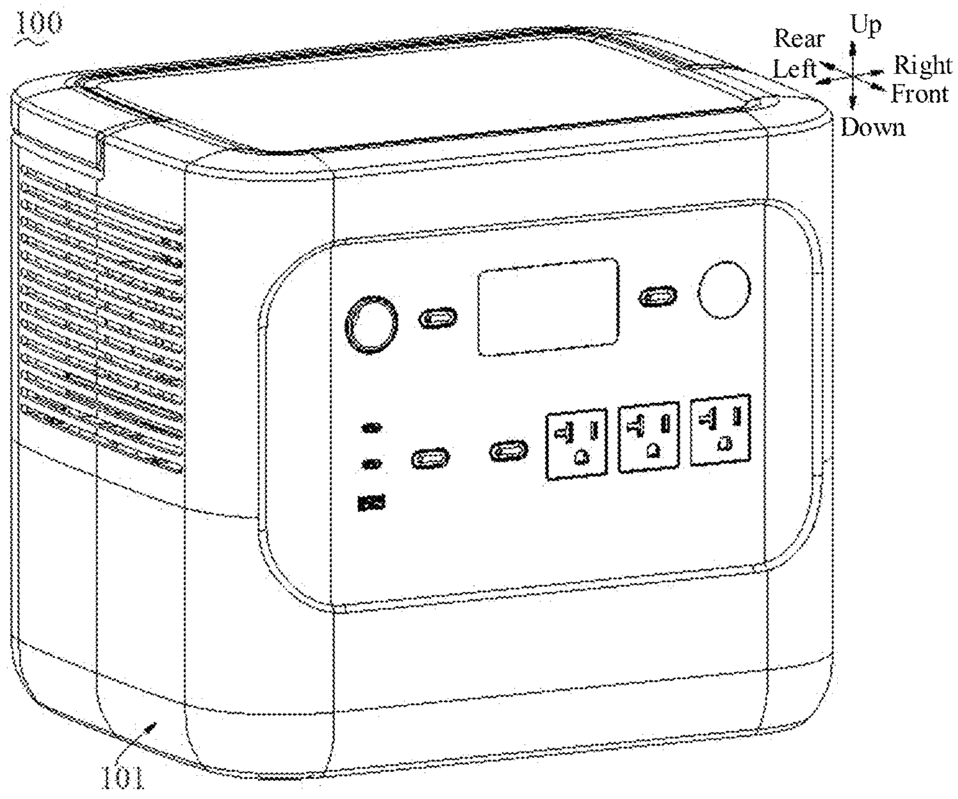

Referring to FIG. 11 to FIG. 13, an embodiment of the present disclosure provides an energy storage power supply 100. The energy storage power supply 100 includes a second housing 101, at least one second cell 103, a fixing member 15, and an electrical connection member 17. The second housing 101 is provided with a second positioning portion 111 at an inner wall of the second housing 101. Each of the at least one second cell 103 has a first end 131 inserted in the second positioning portion 111 and a second end 132 opposite to the first end 131. Each of the at least one second cell 103 has two electrodes 133 disposed at the second end 133. The fixing member 15 is configured to fix the second end 132 of each of the at least one second cell 103. The electrical connection member 17 is electrically connected to the second end 132 of each of the at least one second cell 103.

In the above energy storage power supply 100, the second positioning portion 111 is arranged at the inner wall of the second housing 101, and the first end 131 of the second cell 103 can be directly inserted in the second positioning portion 111, instead of being fixed by the support to be assembled into the second housing 101. As such, some parts can be omitted while simplifying the mounting procedures. The second housing 101 does not require the mounting space, which can lower the cost of the energy storage power supply 100 and reduce the volume of the energy storage power supply 100. In addition, when the second end 132 of the second cell 103 is fixed by the fixing member 15 and connected to the electrical connection member 17, the overall fixing and the electrical connection of the second cell 103 in the second housing 101.

In an embodiment, as illustrated in FIG. 11 and FIG. 12, at least a part of the second housing 101 of the energy storage power supply 100 encloses a receiving chamber 112, and a second positioning portion 111 is provided in the receiving chamber 112 and is configured to guide and fix one end of each of the at least one second cell 103. As such, as compared to fixing the two ends of the second cell 103 using the two supports respectively, the number of supports can be reduced, simplifying the assembly steps and reducing the production cost.

In an embodiment, as illustrated in FIG. 11, the second cell 103 includes a first end 131 and a second end 132 opposite to the first end 131. As a result, the second cell 103 inside the energy storage power supply 100 can be stabilized by separately fixing the first end 131 and the second end 132 of the second cell 103.

It is understood that the first end 131 and the second end 132 of the second cell 103 may be a lower end and an upper end, a left end and a right end, a front end and a rear end, or other ends opposite to each other, respectively, of the corresponding second cell 103. In relation to factors such as a shape or a placement direction of the second cell 103, the second positioning portion 111 and the fixing member 15 may be fixed by the first end 131 and the second end 132 respectively, to allow the second cell 103 to be safely placed inside the energy storage power supply 100, to ensure normal operation of the energy storage power supply 100, without specific limitation herein.

In an embodiment, the inner wall of the second housing 101 is provided with the second positioning portion 111. In other words, one of the supports is integrated with the second housing 101, i.e., the second positioning portion 111 and the second housing 101 are integrally formed and non-detachable, enabling one end of the second cell 103 to be directly mounted at the second housing 101, and thus to realize the "Cell to pack" (CTP) structure, i.e., a module-free technology, thereby omitting modules to be assembled or reducing the number of modules to be assembled (the modules includes a support, a bolt, and other spare parts), without reserving the mounting space. In this way, the cost can be lowered and the miniaturization of the product can be achieved.

In an embodiment, the second positioning portion 111 may be arranged at different positions of the inner wall of the second housing 101, such as an inner side wall, an inner bottom wall, or other positions of the second housing 101, to allow the first end 131 of each of the at least one second cell 103 to be fixed to the second positioning portion 111. In this way, it is ensured that one of the ends of the at least one second cell 103 is stably arranged in the energy storage power supply 100, without specific limitation herein.

For example, the second positioning portion 111 may be a positioning groove that matches the shape and the size of the first end 131. As illustrated in FIG. 11, for example, the second positioning portion 111 is a cylindrical recess hole, such that the first end 131 of the at least one second cell 103 can form an interference fit with the corresponding positioning groove, to improve stability of the connection between the second cell 103 and the second positioning portion 111.

In an embodiment, as illustrated in FIG. 11, the energy storage power supply 100 includes a fixing member 15 detachably connected in the energy storage power supply 100. The fixing member 15 is arranged opposite to the second positioning portion 111 and can be configured to fix the second end 132 to ensure that the second end 132 is stably arranged inside the energy storage power supply 100. Thus, the overall stability of the at least one second cell 103 is improved. Therefore, safe operation of the energy storage power supply 100 is ensured.

In an embodiment, as illustrated in FIG. 11, the electrical connection members 17 are the busbars and configured to connect a plurality of second cell 103, when provided, in series and/or in parallel.

In an embodiment, as illustrated in FIG. 11, a plurality of electrical connection members 17 is provided with a plurality of positioning holes (not shown) respectively, and the fixing member 15 is provided with a plurality of positioning posts (not shown) corresponding to the plurality of positioning holes, to connect the positioning holes and the positioning posts correspondingly. For example, the positioning holes and the positioning posts may form an interference fit, or may be engaged with each other through a screw, or may be connected in other ways, thereby ensuring that the electrical connection member 17 is fixedly mounted at the fixing member 15 with good connection stability.

In an embodiment, the fixing member 15 is formed with a plurality of second through holes 1511 to ensure that the second end 132 of each of the at least one second cell 103 is exposed through the plurality of second through holes 1511, such that the electrical connection member 17 can be electrically connected to the at least one second cell 103. In this way, the energy storage power supply 100 can output the electrical energy by discharging or input the electrical energy by charging.

It will be appreciated that, as illustrated in FIG. 11 and FIG. 12, the electrical connection member 17 may be electrically connected to the at least one second cell 103 through welding, to connect the at least one second cell 103 in series and/or in parallel by means of the electrical connection member 17. In this way, the energy storage power supply 100 can provide a suitable power supply voltage to satisfy a user's usage requirements.

In an example, the electrical connection member 17 can be configured to connect each positive electrode of the at least one second cell 103 to form a total positive connection port, and each negative electrode to form a total negative connection port, i.e., the electrical connection member 17 is connected in parallel to the at least one second cell 103 to allow the at least one second cell 103 to be formed as a stable output power supply, and thus to ensure the normal operation and good durability of the energy storage power supply 100.

In another example, the electrical connection member 17 can configured to connect each positive electrode and each negative electrode of the at least one second cell 103 sequentially and alternately, such that the positive electrode and the negative electrode connected to the two ends of the electrical connection member 17 are a positive connection port and a negative connection ports, respectively. That is, the electrical connection member 17 is connected in series to the at least one second cell 103 to allow the at least one second cell 103 to be formed as a large-voltage output power supply, to satisfy the user's usage requirements.

In an embodiment, as illustrated in FIG. 11 and FIG. 12, the energy storage power supply 100 further includes a collection plate 19 provided with nickel strips in an array in a left-right direction, and the nickel strips may be fixedly connected to the electrical connection member 17 through welding such as laser welding to ensure that the energy storage power supply 100 timely collects and obtains the state information of each of the at least one second cell 103. The state information of the at least one second cell 103 includes information such as a temperature, a current, and a voltage, and thus to ensure the safe operation of the energy storage power supply 100.

That is, after the electrical connection member 17 has been welded to the respective second cell 103, the collection plate 19 can be fixed to the corresponding position of the electrical connection member 17 by the screw. After the collection plate 19 is fixed, the nickel strips of the collection plate 19 and the electrical connection member 17 can be connected through the electrical connection such as the laser welding, thereby realizing the electrical connection between the collection plate 19 and the electrical connection member 17.

It is worth noting that the first end 131 may be an electrode-free end, and the second end 132 may be an electrode-end with at least two electrodes of different electrical polarities. In this case, in the energy storage power supply 100, the electrical connection member 17 and the collection plate 19 can be provided only at the second end 132 of the second cell 103, such that the electrical connection member 17 and the collection plate 19 are electrically connected to the positive electrode and the negative electrode arranged at the second end 132 of the second cell 103, respectively, thereby ensuring normal charging and discharging of the second cell 103. Therefore, the number and the arrangement space of the electrical connection members 17 and the collection plates 19 are reduced, thereby facilitating the miniaturized design of the energy storage power supply 100.

Referring to FIG. 14 to FIG. 21, in some embodiments, the second positioning portion 111 is located at an inner bottom wall 113 or the inner side wall 115 of the second housing 101.

In this way, the second cell 103 is ensured to be stably placed through the inner bottom wall 113 or the inner side wall 115 of the second housing 101 to meet different product mounting requirements.

In an embodiment, as illustrated in FIG. 14 to FIG. 17, the second positioning portion 111 is located at the inner bottom wall 113 of the second housing 101. That is, the second positioning portion 111 is in no contact with a side edge of the second housing 101, which can form a space for placing the second cell 103 inwardly perpendicularly to a plane of paper on which the drawing is located, such that the inner bottom wall 113 of the second housing 101 and a baffle (not shown) forming the second positioning portion 111 form a stable support structure together, thereby ensuring that the first end 131 of the second cell 103 is stably placed in the second positioning portion 111.

It is to be understood that the inner bottom wall 113 of the second housing 101 may serve as a support base that can carry the second cell 103 placed in the second positioning portion 111 to improve the stable placement of the second cell 103, thereby ensuring the safe operation of the second cell 103.

Figure 15:
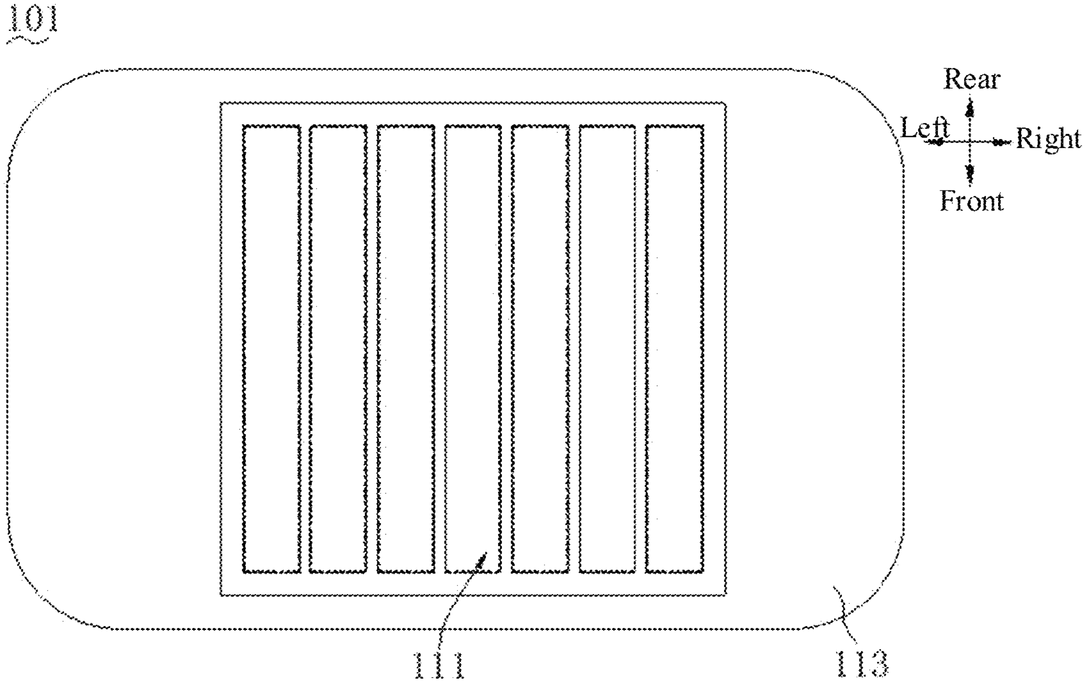

In an example, as illustrated in FIG. 15, the second cell 103 may be sheet like or of a square shape and can be placed in the second positioning portion 111 provided with rectangular hole to ensure the stability of the second cell 103.

Figure 14:
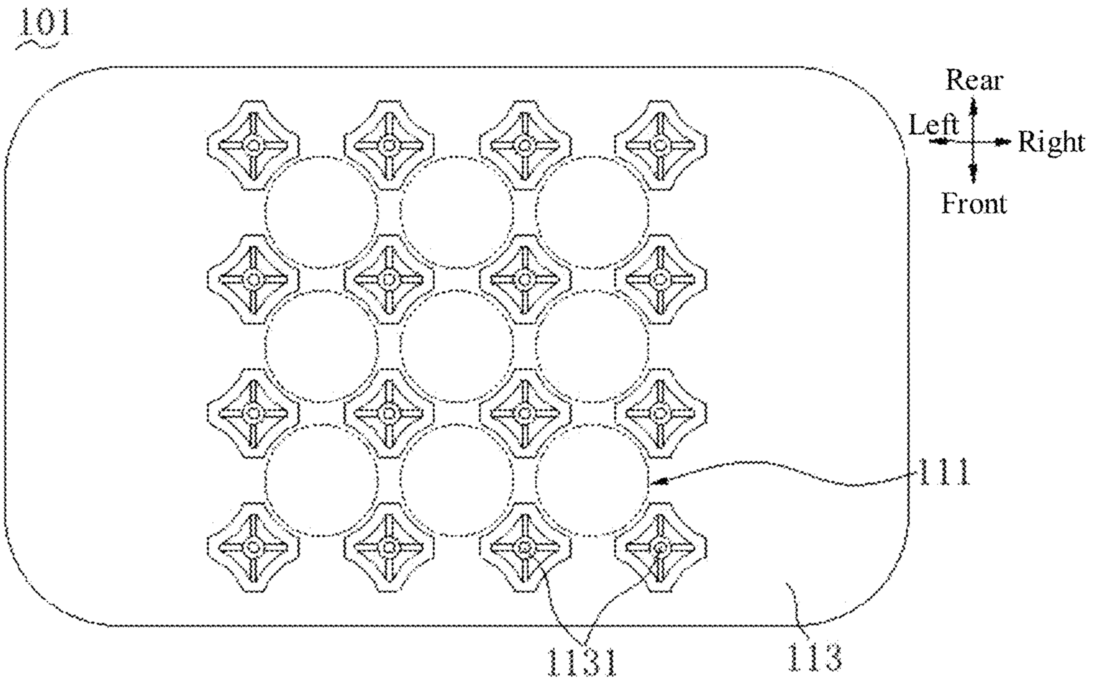
FIG. 14 to FIG. 17 are top views of an inner bottom wall of a housing according to an embodiment of the present disclosure provided with a positioning portion.
Figure 16:
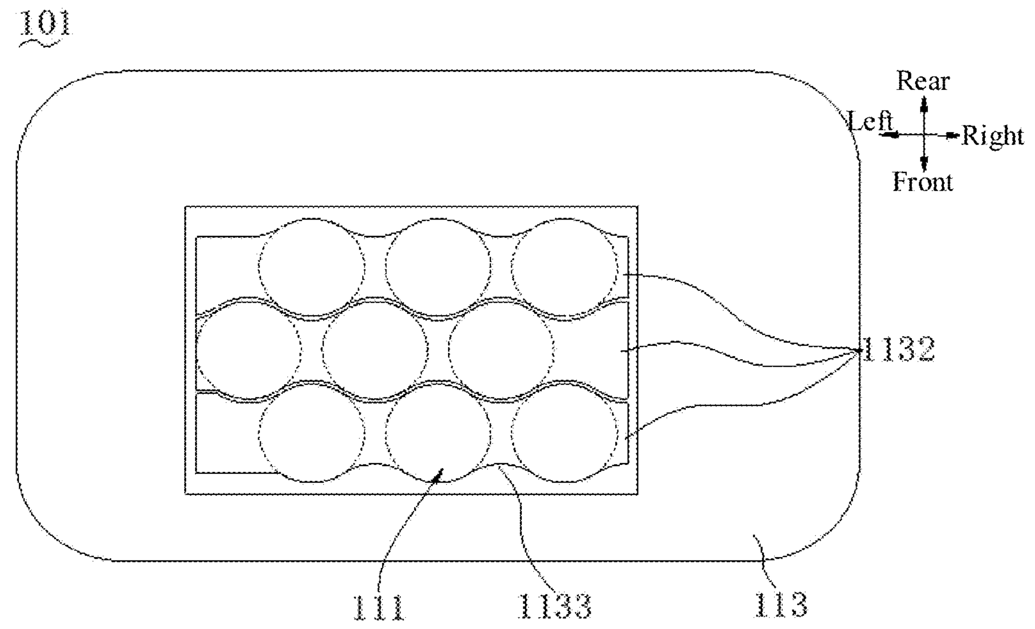
Figure 17:
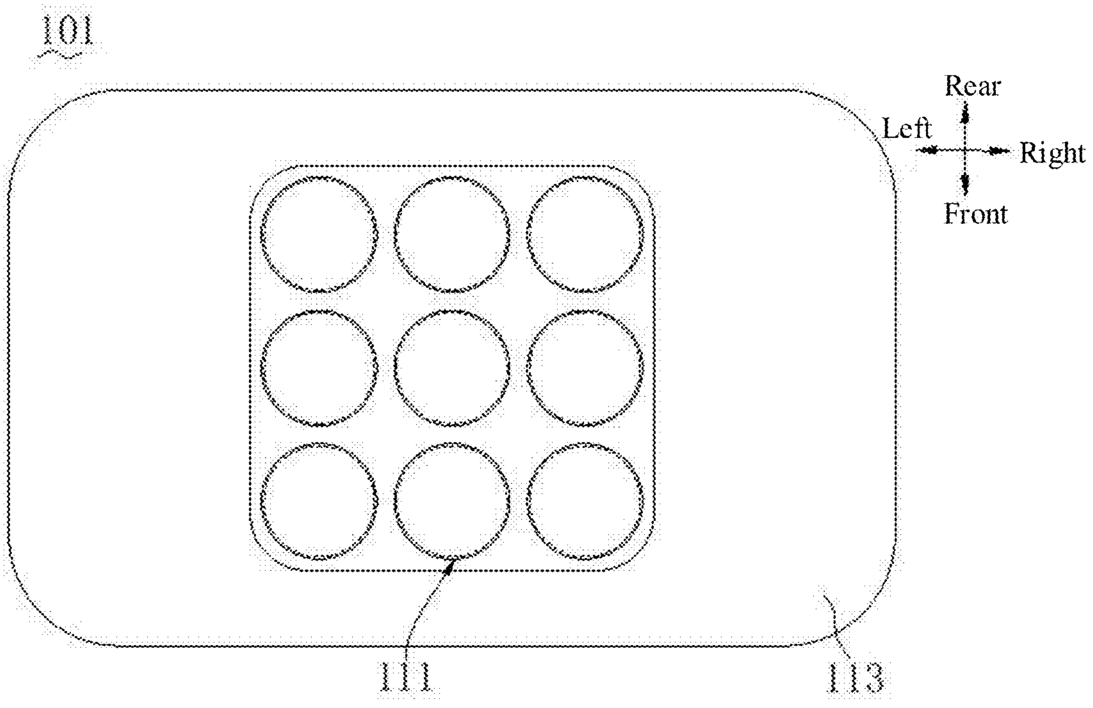

In another example, as illustrated in FIG. 14, FIG. 16, and FIG. 17, the second cell 103 may also be of a cylindrical shape and can be placed in the second positioning portion 111 provided with a cylindrical recess hole to ensure the stability of the second cell 103.

In other examples, the second cell 103 may also be of other shapes to match the second positioning portion 111 of the corresponding shape to ensure the stable placement of the second cell 103, without specific limitation herein.

In an embodiment, as illustrated in FIG. 18 to FIG. 21, the second positioning portion 111 is located at an inner side wall 115 of the second housing 101. That is, the second positioning portion 111 is in direct contact with a side edge of the second housing 101, which can form a space for placing the second cell 103 inwardly perpendicularly to a plane of paper on which the drawing is located, such that the inner side wall 115 and inner bottom wall 113 of the second housing 101 and a baffle (not shown) forming the second positioning portion 111 enclose a stable support structure. Thus, the first end 131 of the second cell 103 is stably placed in the second positioning portion 111.

It can be understood that the inner side wall 115 of the second housing 101 can serve as a part of the baffle that can limit a position of the second cell 103 and fix the second cell 103, enabling the second cell 103 to be stably placed in the second positioning portion 111. At the same time, the inner bottom wall 113 of the second housing 101 can serve as a support base that can carry the second cell 103 placed in the second positioning portion 111, to improve the stable placement of the second cell 103, thereby ensuring the safe operation of the second cell 103.

Figure 18:
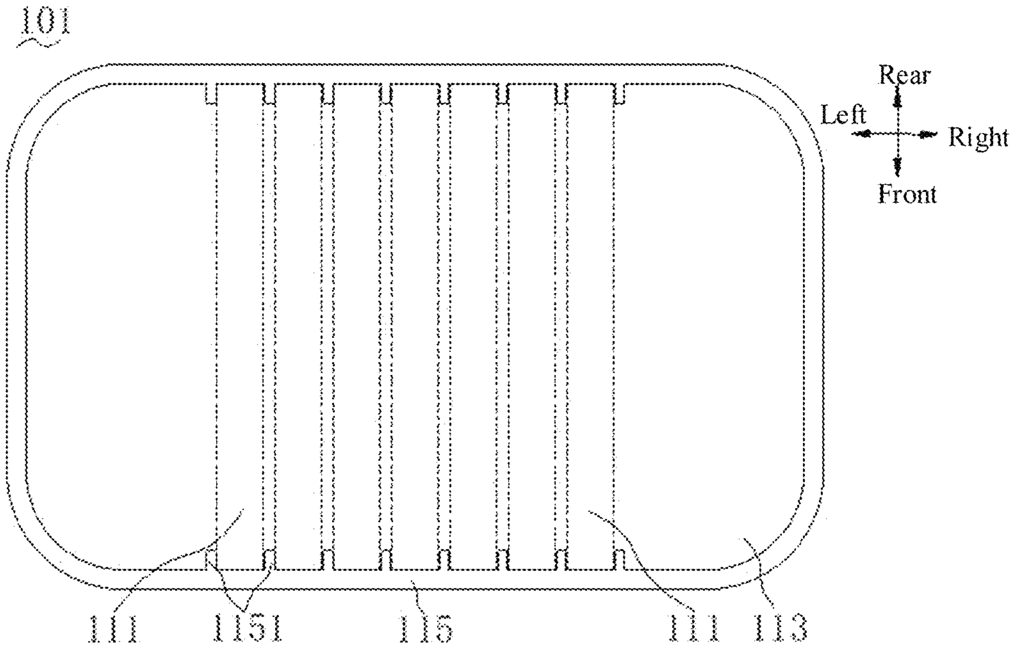
FIG. 18 to FIG. 21 are top views of an inner side wall of a housing according to an embodiment of the present disclosure provided with a one-piece support.
Figure 19:
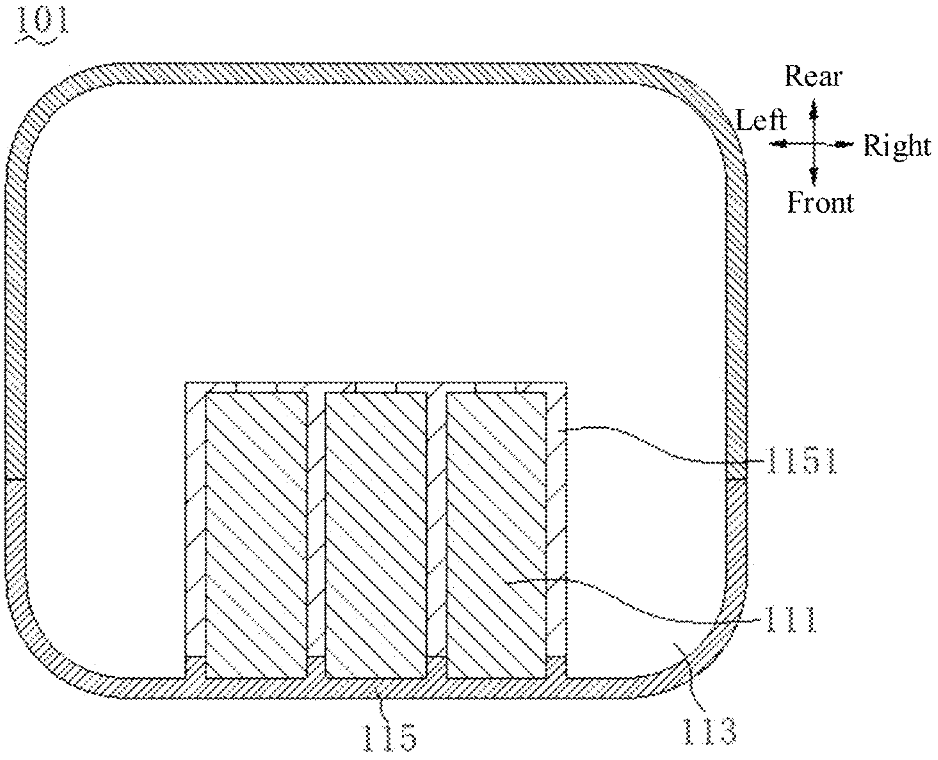

In an example, as illustrated in FIG. 18 and FIG. 19, the second cell 103 may be of a sheet shape or a square shape and can be placed in the second positioning portion 111 provided with a rectangular hole to ensure the stability of the second cell 103.

Figure 20:
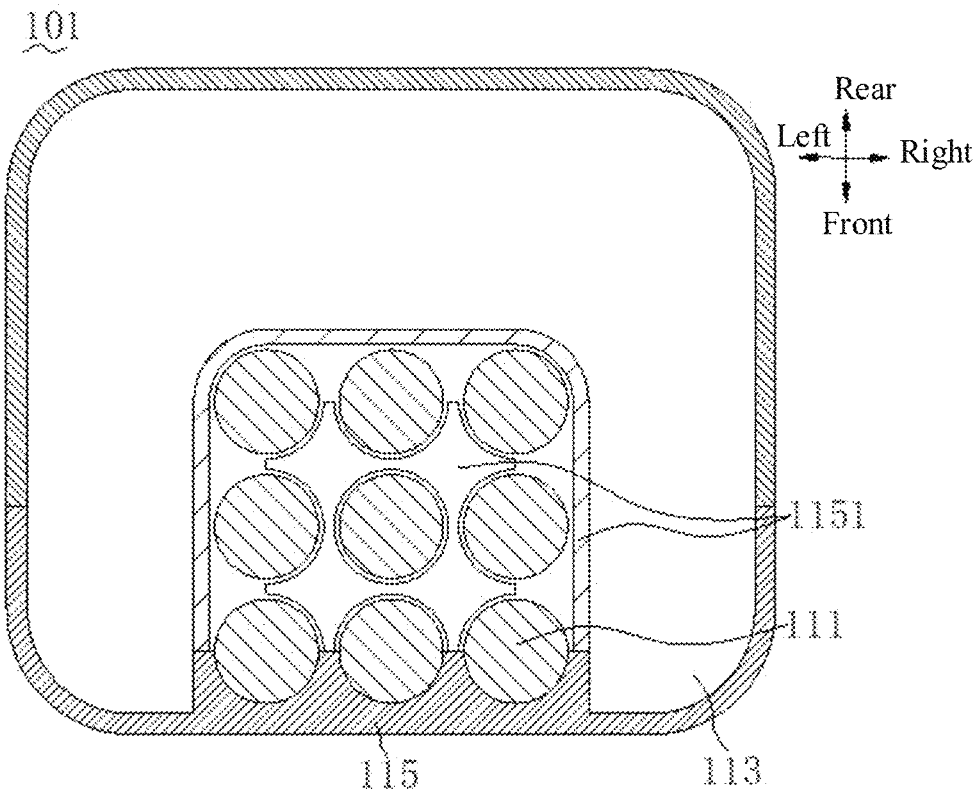

In another example, as illustrated in FIG. 20, the second cell 103 may also be in a cylindrical shape and can be placed in the second positioning portion 111 provided with a cylindrical recess hole to ensure the stability of the second cell 103.

Figure 21:
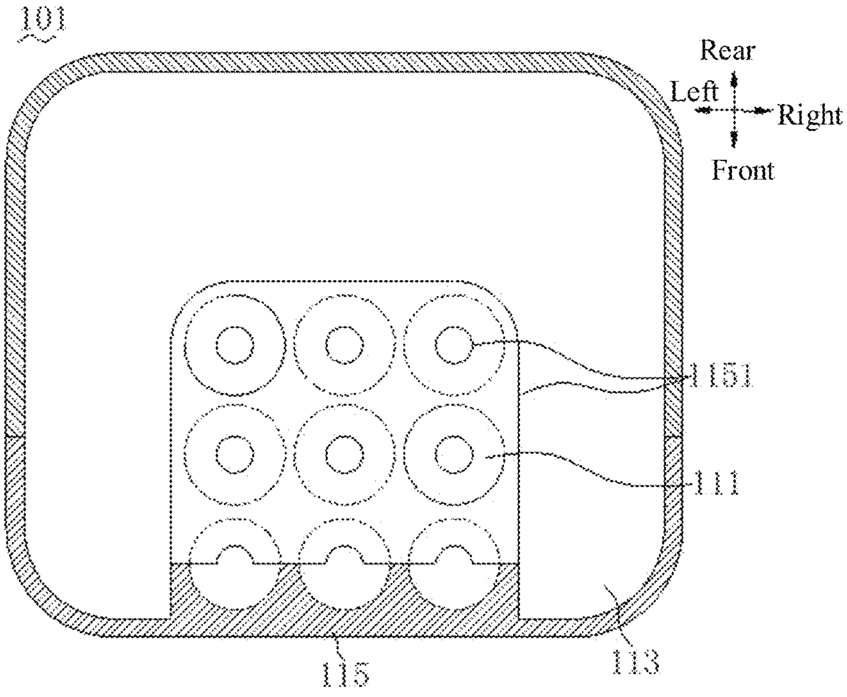

In yet another example, as illustrated in FIG. 21, the second cell 103 may also be of a hollow cylinder shape and can be placed in the second positioning portion 111 provided with a circular hole to ensure the stability of the second cell 103.

In other examples, the second cell 103 may also be of other shapes to match the second positioning portion 111 of the corresponding shape, which is not specifically limited herein, as long as the stable placement of the second cell 103 can be ensured.

In summary, with the second positioning portion 111 located at the inner bottom wall 113 or the inner side wall 115 of the second housing 101, thereby saving the use and mounting space of the support. Thus, the number and energy density of the second cells 103 placed therein can be increased, with great practicality.

Referring to FIG. 14, in some embodiments, a plurality of posts 1131 arranged in an array are provided on an inner bottom wall 113 of the second housing 101. The second positioning portion 111 is a positioning groove formed between four posts 1131 in two adjacent rows and two adjacent columns of the array.

In this way, the first end 131 of the cylindrical second cell 103 can be guided and fixed, providing good security.

In an embodiment, a plurality of posts 1131 are arranged in an array with rows and columns, and a positioning groove is defined by the posts in two adjacent rows and two adjacent columns of the array, such that the plurality of second cells 103 are placed at intervals, providing good security.

It can be understood that, by defining the positioning grooves at intervals by the plurality of posts 1131, the plurality of second cells 103 can be arranged at intervals, reducing problems such as thermal expansion caused by direct contact between the plurality of second cells 103, and reducing the situation where the plurality of second cells 103 are squeezed and deformed by each other due to collision of the energy storage power supply 100. As a result, a safety risk is lowered.

In an embodiment, as illustrated in FIG. 14, a cylindrical recess hole may be defined by posts 1131 in two adjacent rows and two adjacent columns of posts 1131 to ensure stable placement of the cylindrical second cell 103, thereby improving stability of the cylindrical second cell 103.

In detail, an outer peripheral wall of each post 1131 is constructed as a curved surface to define a cylindrical recess hole, and the cylindrical recess hole thus matches the outer peripheral wall of the second cell 103, thereby ensuring the connection effect between the second cell 103 and the second positioning portion 111 to reduce a shaking phenomenon.

In other embodiments, the positioning groove may also be of other shapes, such as a rectangular shape, to ensure the stable placement of the second cell 103 of different shapes, without specific limitation herein.

In an embodiment, as illustrated in FIG. 11 and FIG. 14, preferably, the post 1131 has a height smaller than or equal to a height of the second housing 101 in FIG. 11 to ensure that the second positioning portion 111 has a height smaller than or equal to the height of the second housing 101 in FIG. 11, thereby ensuring that the second cell 103 is stably placed in the second positioning portion 111. In other embodiments, the post 1131 may have a height greater than a height of the second housing 101 in FIG. 11, such that the second positioning portion 111 has a height greater than the height of the second housing 101 in FIG. 11, ensuring that an electronic element (such as an inverter) arranged at the second end 132 of the second cell 103 is stably fixed inside the energy storage power supply 100 by means of other connection members, which is specifically limited herein.

The second housing 101 in FIG. 11 may be a unilateral second housing 101, such as a lower housing integrated with the second positioning portion 111, a left housing integrated with the second positioning portion 111, or a unilateral second housing 101 in other orientations, without specific limitation herein.

Referring to FIG. 16, in some embodiments, a plurality of position-limiting strips 1132 are provided on an inner bottom wall 113 of the second housing 101. Each of the plurality of position-limiting strips 1132 includes two wavy side surfaces 1133. The second positioning portion 111 is a positioning groove formed between two adjacent wavy side surfaces 1133.

In this way, the first end 131 of the cylindrical second cell 103 is inserted in the positioning groove, and the side surface of the cylindrical second cell 103 is closely attached to the wavy side surface 1133, improving the stability of the cylindrical second cell 103.

In an embodiment, a plurality of position-limiting strips 1132 are arranged in a plurality of rows on an inner bottom wall 113 of the second housing 101. Each of the plurality of position-limiting strips 1132 includes two wavy side surfaces 1133 opposite to each other to form a plurality of positioning grooves arranged at intervals in a row direction and a plurality of positioning grooves arranged offset from each other in a column direction. Thus, the plurality of second cells 103 are ensured to be placed at intervals in the second positioning portion 111, providing good security.

It can be understood that by defining the positioning grooves at intervals through the wavy side surface 1133, the plurality of second cells 103 can be ensured to be arranged at intervals, reducing problems such as thermal expansion caused by direct contact between the plurality of second cells 103, and avoiding the situation where the plurality of second cells 103 are squeezed and deformed by each other due to collision of the energy storage power supply 100. As a result, a safety risk is lowered.

In an embodiment, as illustrated in FIG. 16, position-limiting strips 1132 may be arranged in three rows in a left-right direction, and a plurality of cylindrical recess holes may be defined between two wavy side surfaces 1133 of each of the position-limiting strips 1132 to ensure that the plurality of cylindrical second cells 103 are stably placed at safe intervals, thereby improving the stability of the plurality of cylindrical second cells 103.

In other embodiments, the number of position-limiting strips 1132 may be different, and the positioning groove may also be of other shapes, such as a rectangular shape, to ensure the stable placement of the second cells 103 of different shapes, without specific limitation herein.

Referring to FIG. 18 to FIG. 21, in some embodiments, a one-piece support 1151 is provided on an inner sidewall 115 of the second housing 101. The second positioning portion 111 is a positioning groove formed on the one-piece support 1151.

In this way, the supports required for the cells are saved, the first end 131 of the second cell 103 is ensured to be stably fixed through the inner side wall 115 of the second housing 101, and the cost is lowered.

In an embodiment, as illustrated in FIG. 18 to FIG. 21, a one-piece support 1151 is provided on an inner sidewall 115 of the second housing 101, enabling the inner side wall 115 and the one-piece support 1151 to form a second positioning portion 111. Thus, the first end 131 of the second cell 103 can be placed and limited in the second positioning portion 111 and supported by the inner bottom wall 113, thereby ensuring the stability of the second cell 103.

In an embodiment, the second housing 101 and the one-piece support 1151 may be integrally formed through injection molding to save the external support and the mounting space, and to improve structural strength of the second housing 101 and structural strength of the one-piece support 1151. Therefore, the second cell 103 is ensured to be safely placed.

In other embodiments, the second housing 101 and the one-piece support 1151 may also be formed in other ways to ensure that the second cell 103 is safely placed, without specific limitation herein.

In an embodiment, as illustrated in FIG. 18, the one-piece support 1151 may be formed on two opposite inner side walls 115 inside the second housing 101, to form a plurality of rectangular positioning grooves configured to place the sheet-like second cell 103 or the square second cell 103, thereby ensuring the stability and the safety of the second cell 103.

In an embodiment, as illustrated in FIG. 19, the one-piece support 1151 may also be formed on one inner side wall 115 of the second housing 101 (as shown in FIG. 19), or may be formed on two or three adjacent inner side walls 115 of the second housing 101 (not shown), and the one-piece support 1151 has a square shape, to form a plurality of rectangular positioning grooves configured to place the sheet-like second cells 103 or the square second cells 103, thereby ensuring the stability and the safety of the second cell 103, without specific limitation herein.

In an embodiment, as illustrated in FIG. 20, the one-piece support 1151 may be formed on one inner side wall 115 of the second housing 101 (as shown in FIG. 20), or may be formed on two or three adjacent inner side walls 115 of the second housing 101 (not shown in FIG. 20), and the one-piece support 1151 can define a plurality of cylindrical positioning grooves that can be configured to place the cylindrical second cells 103, thereby ensuring the stability and the safety of the second cell 103, without specific limitation herein.

In an embodiment, as illustrated in FIG. 21, the one-piece support 1151 may be formed on one inner side wall 115 of the second housing 101 (as shown in FIG. 21), or may be formed on two or three adjacent inner side walls 115 of the second housing 101 (not shown in FIG.), and the one-piece support 1151 includes cylinders arranged in an array and an outer frame, which can define a plurality of circular positioning grooves configured to place the hollow cylindrical second cells 103, thereby ensuring the stability and the safety of the second cells 103, without specific limitation herein.

In summary, the second housing 101 and the one-piece support 1151 are integrally formed, which can omit the external support and save the mounting space to ensure the stable placement of the second cell 103 and to lower the cost.

Referring to FIG. 14 to FIG. 21, in some embodiments, the positioning groove has a circular shape or a rectangular shape.

This ensures that the cylindrical second cell 103 and the rectangular second cell 103 can be stably placed in the positioning grooves of the corresponding shapes respectively, thereby improving adaptability and the safety of the second cells 103 of different shapes.

In an embodiment, as illustrated in FIG. 14, FIG. 16, FIG. 17, FIG. 20, and FIG. 21, the positioning groove has a circular shape and can be configured to place the cylindrical second cell 103, such that the cylindrical second cell 103 is matched with and connected to the circular positioning groove, thereby improving the safety of the cylindrical second cell 103.

In another embodiment, as illustrated in FIG. 15, FIG. 18, and FIG. 19, the positioning groove has a rectangular shape and can be configured to place the sheet-like second cell 103 or the square second cell 103, such that the sheet-like second cell 103 or the square second cell 103 is matched with and connected to the rectangular positioning grooves, thereby improving the security of the sheet-like second cell 103 or the square second cell 103.

It will be appreciated that, in an example, the second cell 103 may form an interference fit with the positioning groove to ensure that the second cell 103 is stably placed, thereby ensuring the safe operation of the second cell 103.

In another example, when the second cell 103 is placed in the positioning groove, the second cell 103 can be stably connected to the positioning groove by injecting a colloid, thereby ensuring the safe operation of the second cell 103.

The colloid may be a thermal conductive adhesive. On the one hand, the colloid can strengthen a connection effect of the second cell 103, and on the other hand, the colloid can also dissipate heat generated by the second cell 103 through the second housing 101 for effective heat dissipation of the second cell 103, providing the good safety.

In summary, with the positioning groove having the circular shape or the rectangular shape, the cylindrical second cell 103 and the rectangular second cell 103 can be ensured to be placed stably and the adaptability of placing the second cell 103 of different shapes is improved, providing the good practicality.

In some embodiments, the second cell 103 includes a cylindrical cell or a sheet-like cell.

Therefore, by providing the second cell 103 in different shapes, actual needs of the user can be met.

In an embodiment, the second cell 103 includes a cylindrical cell or a sheet cell. That is, the energy storage power supply 100 may operate with a cylindrical cell or with a sheet-like cell to ensure the user's power demand, without specific limitation herein.

In an embodiment, the second cell 103 may be a cylindrical cell, as illustrated in FIG. 11, which can be placed in the second housing 101 provided with a plurality of cylindrical second positioning portions 111, thereby ensuring a charging and discharging process of the energy storage power supply 100.

In another embodiment, the second cell 103 may be a sheet-like cell (not shown), which can be placed in the second housing 101 provided with a plurality of rectangular second positioning portions 111, thereby ensuring the charging and discharging process of the energy storage power supply 100. The sheet-like cell may be formed by stacking a plurality of second cells 103 side by side.

For example, the sheet-like cell may be a soft-pack cell with an aluminum-plastic film or a steel-plastic film, which has advantages of a small size and large energy density of a single second cell 103. Also, when a safety hazard occurs, a shell of the soft-pack cell may release an internal stress in a form of bulging or cracking, thereby improving safety of the soft-pack cell. As illustrated in FIG. 15, FIG. 18, and FIG. 19, the soft-packed cells each can have a width matched with a width (e.g., a left-right direction) of the second positioning portion 111 and they can be arranged in a length direction (e.g., a front-back direction). In other embodiments, the soft-pack cells each can have a width approximately half of a width of the second positioning portion 111, and therefore two rows of soft-pack cells 21 can be arranged in parallel inside the second positioning portion 111 while reserving a gap for accommodating the fixing colloid.

Figure 22:
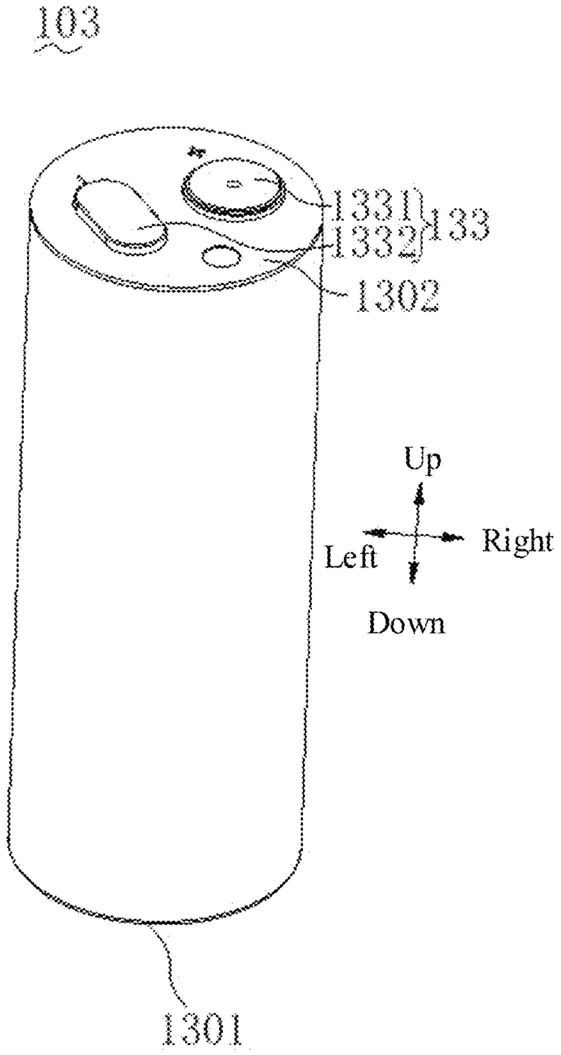
FIG. 22 is a schematic structural view of a cell according to an embodiment of the present disclosure.

Referring to FIG. 22, in some embodiments, the second cell 103 includes two electrodes 133 arranged at a second end 132 of the second cell 103.

In this way, the structure of the energy storage power supply 100 can be simplified with a reduction in welding space, which facilitates the miniaturization.

In an embodiment, as illustrated in FIG. 11 and FIG. 22, the second cell 103 includes a first end 131 and a second end 132. The first end 131 and the second end 132 are arranged opposite to each other and are stably connected by the second positioning portion 111 and the fixing member 15, respectively, thereby ensuring the safe operation of the second cell 103.

In an embodiment, the second cell 103 includes two electrodes 133 located at the second end 132 of the second cell 103. That is, the first end 131 is an end provided with no electrode 133 and connected to the second positioning portion 111, while the second end 132 is an end provided with the two electrodes 133 and connected to the fixing member 15, the electrical connection member 17, and the collection plate 19, to ensure an input or an output of the power supply.

In an embodiment, as illustrated in FIG. 11 and FIG. 22, the two electrodes 133 include a third electrode 1331 and a fourth electrode 1332. The third electrode 1331 may be a positive electrode and the fourth electrode 1332 may be a negative electrode to form a positive terminal and a negative terminal of the second cell 103, ensuring the charging or the discharging of the second cell 103. In other embodiments, the third electrode 1331 may also be a negative electrode and the fourth electrode 1332 may also be a positive electrode, and no specific limitation is made herein.

That is, in an embodiment, one of the two electrodes 133 is a positive electrode and the other one of the two electrodes is a negative electrode.

In this way, it is ensured that the charging function or the discharging function can be realized on the same side of the second cell 103, and winding steps and welding steps are reduced, which helps to improve the miniaturization of the energy storage power supply 100.

It can be understood that the two electrodes 133 are located at the second end 132 of the second cell 103, that is, the two electrodes 133 are located at the same side of the second cell 103, which can reduce the arrangement of the electrical connection member 17 and the collection plate 19 and the like at the first end 131, reduce the welding steps, save the mounting space, lower the cost, and facilitate the miniaturized design of the energy storage power supply 100, and provide the good practicality.

In other embodiments, the first end 131 may also be an end provided with two electrodes 133, and the second end 132 may also be an end provided with no electrode 133 to ensure the normal operation of the energy storage power supply 100, and no specific limitations are made herein.

In some embodiments, the two electrodes 133 are two protruding posts of different shapes or different sizes.

In this way, the positive electrode and the negative electrode of the second cell 103 can be easily distinguished based on the shapes or the sizes of the protruding posts, thereby improving accuracy of the mounting and the connection of the second cell 103 and ensuring safe use of the energy storage power supply 100.

In an embodiment, the two electrodes 133 are two protruding posts of different shapes or different sizes, allowing the two electrodes 133 to be easily distinguished to ensure correct wiring of the second cell 103, thereby satisfying the user's power supply needs for the series-connected second cell 103 or the parallel-connected second cell 103.

It can be understood that the protruding posts may be a third electrode 1331 and a fourth electrode 1332 of different shapes and different polarities illustrated in FIG. 22. The protruding post may have a round shape and an oval shape, thereby helping to distinguishing the wiring to ensure the safe use.

That is, the round protruding post may be a positive electrode and the oval protruding post may be a negative electrode, or the round protruding post may be a negative electrode and the oval protruding post may be a negative electrode. In other embodiments, the protruding post may also have other shapes, and no specific limitation is made herein.

In some embodiments, a protruding post is provided on the second end 132 of the second cell 103 as one of the two electrodes 133, while other parts of the second end 132 of the second cell 103 serve as the other one of the two electrodes 133.

In this way, the charging input and the discharging output at the second end 132 of the second cell 103 are realized, thereby ensuring the normal operation of the energy storage power supply 100.

In an embodiment, a protruding post is provided on the second end 132 of the second cell 103 as an electrode 133, i.e., as a terminal of the second cell 103.

In an embodiment, the other parts of the second end 132 of the second cell 103 serve as the other one of the two electrodes 133. That is, the other one of the two electrodes 133 can be formed in the parts of the second end 132 other than a region occupied by the protruding post. For example, another protruding post or a protruding post in other forms is disposed at the other parts of the second end 132 to form another terminal of the second cell 103, thereby achieving the functions of the charging input and the discharging output at the second end 132 of the second cell 103 and saving the welding space for arranging the second cell 103 at the two ends, which is practical.

Referring to FIG. 11, in some embodiments, the fixing member 15 includes a split support 151. The split support 151 is formed with a plurality of second positioning portions (not shown) configured to fix the second end 132. Each of the plurality of second positioning portions has a second through hole 1511 through which a corresponding protruding post passes.

In this way, the second end 132 of the second cell 103 is stably placed, thereby ensuring the overall stability of the second cell 103.

In an embodiment, as illustrated in FIG. 11, the split support 151 may be a removable support, which may be arranged at the second end 132 of the second cell 103 and fixed to the second housing 101 by screws 152, thereby ensuring that the second cell 103 is stably arranged inside the energy storage power supply 100.

It can be understood that, as illustrated in FIG. 11, the split support 151 may be provided with screws 152, and the second housing 101 may have corresponding screw holes with threads, to detachably connect the split support 151 to the second housing 101, thereby ensuring assembly, maintenance, and replacement of the second cell 103.

In an embodiment, the split support 151 is formed with a plurality of second positioning portions (not shown). Each of the plurality of second positioning portions may be a blind hole that match the shape and the size of the second end 132 of the second cell 103, which may form an interference fit for fixing the second end 132 of the second cell 103 to the split support 151.

In an embodiment, the split support 151 is provided with a plurality of second through holes 1511, and the second through hole 1511 has a smaller diameter than the second end 132 of the second cell 103 and may form a concentric circle arrangement with the second positioning portion (not shown). Thus, the second end 132 of the second power cell 103 abuts against the second positioning portion, i.e., against the split support 151 at a circumference of the second through hole 1511, thereby allowing for the fixing of the second end 132 of the second cell 103. Furthermore, as the first end 131 of the second cell 103 is fixed by the second positioning portion 111, the second cell 103 as a whole is stably fixed inside the energy storage power supply 100.

In addition, by disposing the two electrodes 133 on the second end 132 of the second cell 103, the two electrodes 133 can pass through the second through hole 1511 to be welded to the electrical connection member 17, allowing the second cell 103 to be electrically connected to the electrical connection member 17, thereby ensuring the normal charging and discharging process of the second cell 103.

In an embodiment, the second through-hole 1511 may be a cylindrical hole or in other shapes, which is not specifically limited herein, as long as the second end 132 of the second cell 103 abuts against the split support 151 and is fixed to the position of the second through hole 1511.

In some embodiments, the fixing member 15 includes a fixing colloid.

In this way, the second cell 103 is stably placed in the energy storage power supply 100, thereby ensuring the safe operation of the second cell 103.

In an embodiment, the fixing member 15 includes a fixing colloid. That is, when the first end 131 of the second cell 103 is fixed to the second positioning portion 111, the second cell 103 as a whole can be stably connected in the energy storage power supply 100 through the fixing colloid, thereby ensuring the safe operation of the second cell 103.

It can be understood that, in an embodiment, as the second cells 103 are arranged in an array by means of the second positioning portion 111, it is only required to inject the fixing colloid into a receiving chamber 112 of the second housing 101 and direct the fixing colloid to the gaps between the plurality of second cells 103 when the first end 131 of each of the at least one second cell 103 is inserted in the second positioning portion 111. Therefore, the second ends 132 of the plurality of second cells 103 can be stably connected in the energy storage power supply 100. Thus, the second cells 103 are ensured to be stably arranged as a whole to ensure the safe operation of the second cell 103.

In an embodiment, the fixing colloid may be a structural adhesive.

On the one hand, the structural adhesive can withstand relatively great loads. By injecting the structural adhesive in the gaps of the plurality of second cells 103, impact resistance of the second cells 103 can be enhanced. When the second housing 101 of the energy storage power supply 100 suffers damage that directly impacts the second cell 103, the structural adhesive can withstand a part of an impact force and meanwhile can transmit the impact force to the overall second cells 103 to reduce the impact damage.

On the other hand, the structural adhesive has good corrosion resistance. When an electrolyte leaks out of the second cells 103 due to structural damage of some of the second cells 103 or the electrolyte is ejected from an explosion-proof valve (not shown) of the second cells 103 due to thermal runaway, the structural adhesive can avoid further leakage of the electrolyte and corrosion of other second cells 103 or other structural components.

In addition, the structural adhesive can also have good thermal conductivity, and therefore to heat generated by the second cells 103 is transferred to the second positioning portion 111 and the second housing 101, which helps to lower an operating temperature of the second cells 103, thereby ensuring the safe operation of the second cells 103.

Figure 23:
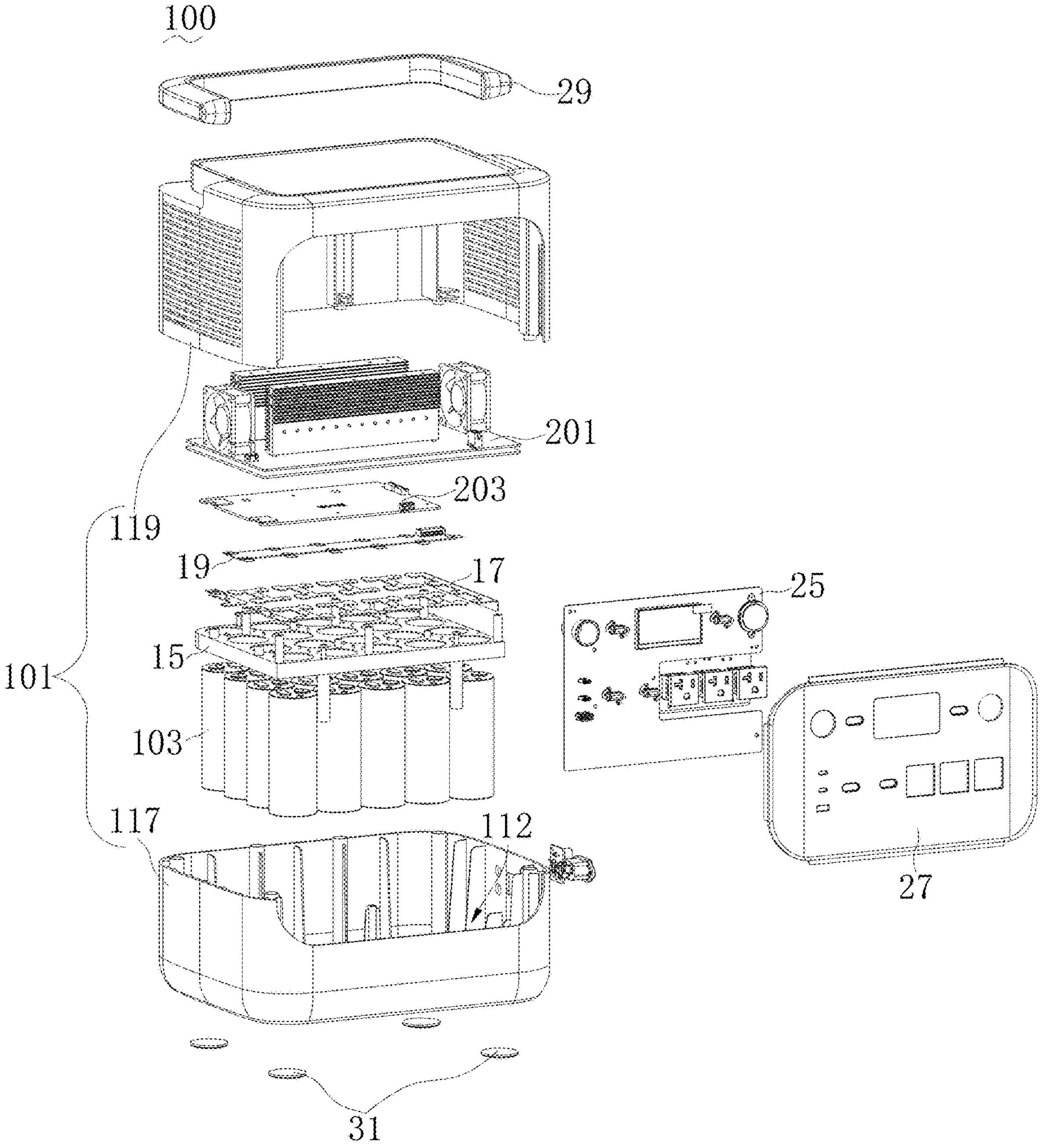
FIG. 23 is another perspective exploded schematic view of an energy storage power supply according to an embodiment of the present disclosure.

Referring to FIG. 23, in some embodiments, the second housing 101 includes a third casing 117 and a fourth casing 119. The third casing 117 is detachably connected to the fourth casing 119. The second positioning portion 111 is arranged at the third casing 117 or the fourth casing 119.

Therefore, this facilitates easier assembly and maintenance, which is practical and convenient.

In an embodiment, as illustrated in FIG. 23, the second housing 101 includes a third casing 117 and a fourth casing 119. The third casing 117 may be a lower housing and the fourth casing 119 may be an upper housing, and the third casing 117 and the fourth casing 119 are arranged opposite to each other and may be matched to be connected to each other through thread, snap-fitting, or clamp, etc., to provide a relatively stable and sealed environment, thereby ensuring that the safe and stable operation of the second cell 103 inside the energy storage power supply 100.

In some embodiments, the third casing 117 and the fourth casing 119 may also be arranged at a front part and a rear part or a left part and a right part of the second housing 101 respectively, or the third casing 117 and the fourth casing 119 are arranged at two opposite corners of the second housing 101.

It can be understood that the third casing 117 and the fourth casing 119 may be detachably connected to each other through thread, snap-fitting, or clamp, etc. The third casing 117 and the fourth casing 119 form a receiving chamber 112 configured to accommodate the second cell 103. Therefore, ease of assembly or disassembly for the maintenance can be increased.

In an embodiment, the second positioning portion 111 is disposed on the third casing 117 or the fourth casing 119. It can be understood that when the third casing 117 is a lower housing, the second positioning portion 111 is arranged at the third casing 117 and may serve to fix and support the second cell 103. When the fourth casing 119 is a lower housing, the second positioning portion 111 is arranged at the fourth casing 119 and may serve to fix and support the second cell 103. When the second housing 101 is placed sideways, the second positioning portion 111 may be arranged at the third casing 117 or the fourth casing 119, both of which can ensure the fixing and the supporting of the second cell 103, thereby ensuring the normal operation of the second cell 103.

Further, referring to FIG. 23, in some embodiments, the energy storage power supply 100 may further include an inverter 201, a battery management system 203, and a main board 25 that are arranged inside the second housing 101, and a front panel 27 arranged outside the second housing 101.

The inverter 201 is arranged above the second cell 103. The inverter 201 may be electrically connected to the second cell 103 and configured to convert a direct current generated by the second cell 103 into an alternating current for use by an electrical device.

The battery management system 203 is arranged between the second cell 103 and the inverter 201 and can be configured to monitor status information of the second cell 103, such as a current, a temperature or a voltage, to avoid overcharge, over-discharge or a short circuit of the second cell 103, and thus to protect the second cell 103 from damage.

The main board 25 may be electrically connected to the second cell 103 and the inverter 201 and configured to obtain user instructions and control a charging or discharging process of the second cell 103 and a charging or discharging process of the inverter 201 through a user input port.

The front panel 27 is electrically connected to the main board 25 and can be configured to display information such as a quantity of electricity of the energy storage power supply 100 and a battery temperature. The front panel 27 may further include a port configured to connect the energy storage power supply 100 to an electrical device or a charging device to allow the second cell 103 to supply energy to the electrical device or to be charged by the charging device.

In an embodiment, the energy storage power supply 100 may further include a handle 29 and a foot pad 31.

The handle 29 is in a U-shape and connected to the fourth casing 119, while the handle 29 can be folded to be accommodated in a groove formed by the fourth casing 119. As a result, the energy storage power supply 100 is portable and can be easily placed, which is labor-saving and practical.

In an example, the handle 29 may be formed as one piece using a hollow aluminum material to reduce the weight of the energy storage power supply 100 and guarantee the support strength at the same time.

In an embodiment, a plurality of foot pads 31 may be provided on a bottom of the third casing 117 and can be configured to increase a friction force at the bottom of the energy storage power supply 100, avoiding collision or falling of the energy storage power supply 100 due to accidentally sliding of the energy storage power supply 100 to improve the safety of the energy storage power supply 100.

In an example, the foot pad 31 may be made of plastic to reduce the cost while ensuring the friction force.

Referring to FIG. 11, in some embodiments, the second positioning portion 111 and the second housing 101 are integrally formed.

In this way, continuity and structural strength between the second positioning portion 111 and the second housing 101 are improved, thereby ensuring the safety and the stability of the energy storage power supply 100.

In an embodiment, the second positioning portion 111 and the second housing 101 are integrally formed, which may improve stability of the connection between the second positioning portion 111 and the second housing 101 to enable better support strength of the second housing 101. Therefore, the second positioning portion 111 is ensured to be stably connected to the first end 131 of the second cell 103. Thus, the safety of the second cell 103 is ensured.

In an embodiment, the second positioning portion 111 and the second housing 101 may be integrally formed through injection molding, or may be integrally formed by other processes to ensure that the second positioning portion 111 and the second housing 101 are integrally formed, thereby reducing the use and the arrangement space of the support, and no specific limitations are made herein.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be defined by the claims as appended and their equivalents.

What is claimed is:

1. An energy storage power supply, comprising:

a housing comprising a first casing and a second casing that are detachably connected to each other, the first casing having a plurality of cylindrical recess holes formed on an inner wall of the first casing;

a plurality of cells in a cylindrical shape, wherein each of the plurality of cells has a first end and a second end opposite to the first end, the second end of each of the plurality of cells being provided with a positive electrode and a negative electrode, and the first ends of the plurality of cells being inserted in the plurality of cylindrical recess holes;

a busbar configured to electrically connect the plurality of cells;

a fixing member configured to fix the second ends of the plurality of cells, wherein the fixing member has a plurality of through holes, the plurality of through holes exposing the second ends of the plurality of cells to enable the busbar to electrically connect the plurality of cells, and each of the plurality of through holes being interference-fitted with the second end of a corresponding cell of the plurality of cells, wherein the fixing member is a split support provided with screws, and wherein the first casing has screw holes with threads corresponding to the screws, the split support being detachably connected to the first casing by screwing the screws of the split support in the screw holes of the first casing;

a panel disposed on the housing, the panel being configured to display a quantity of electricity of the energy storage power supply; and a port configured to connect the energy storage power supply to an electrical device or a charging device, the port being formed on the panel.

2. The energy storage power supply according to claim 1, wherein a plurality of busbars are provided, the plurality of busbars being arranged above the fixing member and configured to connect electrodes of adjacent cells among the plurality of cells.

3. The energy storage power supply according to claim 1, further comprising a collection plate configured to collect state information of the plurality of cells, the collection plate being electrically connected to the busbar.

4. The energy storage power supply according to claim 1, wherein the first casing has a plurality of position-limiting strips formed on an inner bottom wall of the first casing, each of the plurality of position-limiting strips comprising a wavy side surface, and the plurality of cylindrical recess holes being defined by adjacent wavy side surfaces.

5. The energy storage power supply according to claim 1, wherein the first casing has a one-piece support formed on an inner side wall of the housing, the plurality of cylindrical recess holes being defined by the inner side wall of the first casing and the one-piece support.

6. The energy storage power supply according to claim 1, wherein the first casing has a plurality of posts formed on an inner bottom wall of the first casing, the plurality of posts being arranged in an array to define the plurality of cylindrical recess holes.

7. The energy storage power supply according to claim 1, further comprising an inverter received in the housing and electrically connected to the plurality of cells, the inverter being configured to convert a direct current generated by the plurality of cells into an alternating current.

8. An energy storage power supply, comprising:

a housing comprising a first casing and a second casing that are detachably connected to each other, the first casing having a plurality of cylindrical recess holes formed on an inner wall of the first casing;

a plurality of cells in a cylindrical shape, wherein each of the plurality of cells has a first end and a second end opposite to the first end, the second end of each of the plurality of cells being provided with a positive electrode and a negative electrode, and the first ends of the plurality of cells being inserted in the plurality of cylindrical recess holes;

a busbar configured to electrically connect the plurality of cells;

a fixing member configured to fix the second ends of the plurality of cells, wherein the fixing member has a plurality of through holes, the plurality of through holes exposing the second ends of the plurality of cells to enable the busbar to electrically connect the plurality of cells, and each of the plurality of through holes being interference-fitted with the second end of a corresponding cell of the plurality of cells, wherein the fixing member is a split support provided with screws, and wherein the first casing has screw holes with threads corresponding to the screws, the split support being detachably connected to the first casing by screwing the screws of the split support in the screw holes of the first casing;

a panel disposed on the housing, the panel being configured to display a quantity of electricity of the energy storage power supply;

a port configured to connect the energy storage power supply to an electrical device or a charging device, the port being formed on the panel; and a handle disposed on the housing.

9. The energy storage power supply according to claim 8, further comprising:

an inverter received in the housing and electrically connected to the plurality of cells, wherein the inverter is configured to convert a direct current generated by the plurality of cells into an alternating current.

10. The energy storage power supply according to claim 9, further comprising:

a main board disposed in the accommodation chamber and electrically connected to the panel, the inverter and the plurality of cells, wherein the main board is configured to obtain user instructions and control a charging or discharging process of the plurality of cells and the inverter.

11. The energy storage power supply according to claim 8, further comprising:

a battery management system disposed in the accommodation chamber and configured to protect the plurality of cells from damage by monitoring status information of the plurality of cells.

12. The energy storage power supply according to claim 8, wherein a plurality of busbars are provided, the plurality of busbars being arranged above the fixing member and configured to connect electrodes of adjacent cells among the plurality of cells.

13. The energy storage power supply according to claim 8, further comprising a collection plate configured to collect state information of the plurality of cells, the collection plate being electrically connected to the busbar.

14. The energy storage power supply according to claim 8, wherein the first casing has a plurality of position-limiting strips formed on an inner bottom wall of the first casing, each of the plurality of position-limiting strips comprising a wavy side surface, and the plurality of cylindrical recess holes being defined by adjacent wavy side surfaces.

15. The energy storage power supply according to claim 8, wherein the first casing has a one-piece support formed on an inner side wall of the housing, the plurality of cylindrical recess holes being defined by the inner side wall of the first casing and the one-piece support.

16. The energy storage power supply according to claim 8, wherein the first casing has a plurality of posts formed on an inner bottom wall of the first casing, the plurality of posts being arranged in an array to define the plurality of cylindrical recess holes.

17. The energy storage power supply according to claim 8, further comprising:

a plurality of foot pads disposed on a bottom of the second casing, wherein the plurality of foot pads are configured to increase a friction force at a bottom of the energy storage power supply.

* * * * *